US011379855B1

(12) United States Patent
Anderson et al.

(10) Patent No.: US 11,379,855 B1
(45) Date of Patent: Jul. 5, 2022

(54) SYSTEMS AND METHODS FOR PRIORITIZING FRAUD CASES USING ARTIFICIAL INTELLIGENCE

(71) Applicant: Wells Fargo Bank, N.A., San Francisco, CA (US)

(72) Inventors: Rolf Anderson, San Francisco, CA (US); Azita Asefi, Vacaville, CA (US); Alan W. Hecht, San Francisco, CA (US); Ann M. Kirk, Deerwood, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 645 days.

(21) Appl. No.: 15/913,292

(22) Filed: Mar. 6, 2018

(51) Int. Cl.
*G06Q 30/00* (2012.01)
*G06N 20/00* (2019.01)

(52) U.S. Cl.
CPC ......... *G06Q 30/0185* (2013.01); *G06N 20/00* (2019.01)

(58) Field of Classification Search
CPC ........ G06N 20/00; G06N 3/088; G06Q 10/04; G06Q 10/06315; G06Q 20/12; G06Q 10/0635; G06Q 10/06; G06Q 10/0631; G06Q 10/06393; G06Q 30/0185
See application file for complete search history.

(56) References Cited

U.S. PATENT DOCUMENTS

| | | | | |
|---|---|---|---|---|
| 6,601,048 B1 * | 7/2003 | Gavan | ..................... | H04J 3/175 379/111 |
| 6,850,606 B2 * | 2/2005 | Lawyer | .................. | G06Q 10/00 379/114.01 |
| 7,379,993 B2 * | 5/2008 | Valdes | .................. | H04L 41/142 709/224 |
| 7,457,401 B2 * | 11/2008 | Lawyer | .................. | G06Q 10/00 379/114.14 |
| 7,912,246 B1 * | 3/2011 | Moon | .................. | G06K 9/6267 382/118 |

(Continued)

OTHER PUBLICATIONS

Perini, Anna et al. (Apr. 2013). A machine learning approach to software requirements prioritization. IEEE (NPL1) in view of U.S. Pat. No. 6,601,048 to Gavan et al. ("Gavan").*

(Continued)

*Primary Examiner* — Peter Ludwig
(74) *Attorney, Agent, or Firm* — Foley & Lardner LLP

(57) ABSTRACT

A system for prioritizing fraud cases includes a processing circuit and a network interface structured to receive fraud cases having transaction data and an initial priority score. The processing circuit is structured to determine an updated priority score for each fraud case based on case prioritization data comprising rules developed using a machine learning model, initiate an action for each fraud case based on the updated priority score, where the action comprises assembling a first group of the fraud cases in a single database and taking an action on a second group of the fraud cases, assign the first group to a computing terminal associated with a fraud agent, receive an input from the computing terminal regarding a disposition of the first group of fraud cases, update the model based on the input and the transaction data, and restructure the case prioritization data based on the updated model.

27 Claims, 7 Drawing Sheets

(56) References Cited

U.S. PATENT DOCUMENTS

| | | | | |
|---|---|---|---|---|
| 8,706,742 | B1* | 4/2014 | Ravid | G06N 5/04 |
| | | | | 707/749 |
| 8,924,497 | B2* | 12/2014 | Sheridan | G06Q 10/107 |
| | | | | 709/207 |
| 10,311,371 | B1* | 6/2019 | Hotchkies | H04L 67/2847 |
| 11,004,135 | B1* | 5/2021 | Sandler | G06Q 30/0631 |
| 11,182,691 | B1* | 11/2021 | Zhang | G06N 20/00 |
| 2009/0099884 | A1* | 4/2009 | Hoefelmeyer | G06Q 40/02 |
| | | | | 705/7.38 |
| 2009/0319456 | A1* | 12/2009 | Consul | H04L 51/12 |
| | | | | 706/21 |
| 2013/0006668 | A1* | 1/2013 | Van Arkel | G06Q 10/10 |
| | | | | 705/3 |
| 2015/0379072 | A1* | 12/2015 | Dirac | G06N 20/00 |
| | | | | 707/693 |
| 2017/0308613 | A1* | 10/2017 | Zhu | G06F 16/285 |
| 2018/0144269 | A1* | 5/2018 | Wilson | G06N 5/022 |
| 2018/0322417 | A1* | 11/2018 | Bendre | G06F 40/20 |
| 2019/0012605 | A1* | 1/2019 | Rajagopal | G06N 20/00 |

OTHER PUBLICATIONS

Lachmann, Remo et al. (2016). System-Level Test Case Prioritization Using Machine Learning. IEEE.*

* cited by examiner

SYSTEMS AND METHODS FOR PRIORITIZING FRAUD CASES USING ARTIFICIAL INTELLIGENCE

BACKGROUND

Fraudulent activity can include credit card fraud, debit card fraud, mobile wallet fraud, check fraud, wire fraud, loan fraud, identity theft, forgery, and so on. Conventional fraud detection systems attempt to mitigate financial loss by receiving fraud-related data, and reacting to potential fraudulent activity through analysis of the received data. For example, a fraud detection system may receive fraud cases with data relating to various categories, such as credit card transactions, debit card transactions, check transactions, loans, identity theft, etc. In such a system, the fraud cases can be received from various sources, including fraud identification systems operated by third-party entities. A fraud detection system may store received fraud cases in one or more databases based on the category or the type of fraudulent activity. For example, one database may store fraud cases relating to credit card transactions, another database may store fraud cases relating to debit card transactions, and so on. Members of a fraud team who specialize in detecting and mitigating fraudulent activity can retrieve cases from one or more assigned databases for manual review and response.

SUMMARY

In one embodiment, a method includes receiving sets of fraud cases, each fraud case having transaction data and an initial priority score. The method also includes determining an updated priority score for each fraud case based on the transaction data and case prioritization data, the case prioritization data comprising rules developed using a machine learning model. The method also includes assembling a first group of the fraud cases in a single database based on the updated priority score. The method also includes performing an action on a second group of the fraud cases based on the priority scores, where the action comprises at least one of closing a fraud case or transmitting an alert to a user device of an account holder associated with the fraud case. The method also includes assigning the first group of the fraud cases to a fraud agent computing terminal associated with a fraud agent. The method also includes receiving a fraud agent input from the fraud agent computing terminal regarding a disposition of an assigned fraud case. The method also includes updating the machine learning model based on the fraud agent input and the transaction data. The method also includes restructuring the case prioritization data based on the updated machine learning model.

In another embodiment, a provider computing system includes a network interface and a processing circuit having a processor and a memory. The network interface is structured to facilitate data communication via a network. The processor is structured to receive sets of fraud cases, each fraud case having transaction data and an initial priority score. The processor is further structured to assemble a first group of the fraud cases in a single database based on the updated priority score. The processor is further structured to perform an action on a second group of the fraud cases based on the priority scores, where the action comprises at least one of closing a fraud case or transmitting an alert to a user device of an account holder associated with the fraud case. The processor is further structured to assign the first group of the fraud cases to a fraud agent computing terminal associated with a fraud agent. The processor is further structured to receive a fraud agent input from the fraud agent computing terminal regarding a disposition of an assigned fraud case. The processor is further structured to update the machine learning model based on the fraud agent input and the transaction data. The processor is further structured to restructure the case prioritization data based on the updated machine learning model.

In another embodiment, a fraud management processing circuit is included in a provider computing system associated with a provider institution. The fraud management processing circuit is structured to receive sets of fraud cases, each fraud case having transaction data and an initial priority score. The fraud management processing circuit is further structured to assemble a first group of the fraud cases in a single database based on the updated priority score. The fraud management processing circuit is further structured to perform an action on a second group of the fraud cases based on the priority scores, where the action comprises at least one of closing a fraud case or transmitting an alert to a user device of an account holder associated with the fraud case. The fraud management processing circuit is further structured to assign the first group of the fraud cases to a fraud agent computing terminal associated with a fraud agent. The fraud management processing circuit is further structured to receive a fraud agent input from the fraud agent computing terminal regarding a disposition of an assigned fraud case. The fraud management processing circuit is further structured to update the machine learning model based on the fraud agent input and the transaction data. The fraud management processing circuit is further structured to restructure the case prioritization data based on the updated machine learning model.

These and other features, together with the organization and manner of operation thereof, will become apparent from the following detailed description when taken in conjunction with the accompanying drawings.

DETAILED DESCRIPTION

Figure 1:
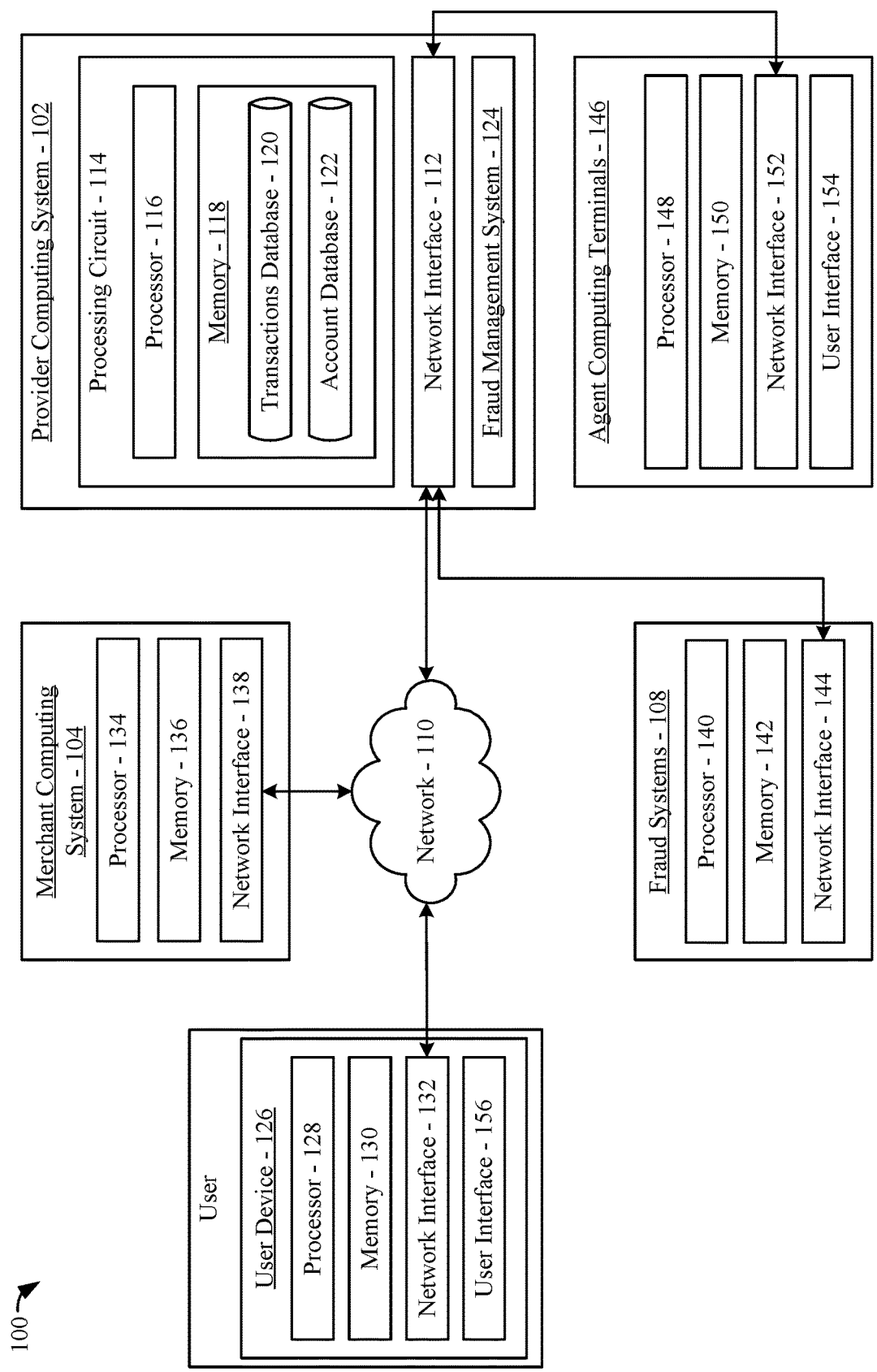
FIG. 1 is a diagram of a system for prioritizing fraud cases, according to an example embodiment.

Referring to the figures generally, systems, methods, and apparatuses for prioritizing fraud cases using artificial intelligence are described herein. A fraud management system can receive fraud cases from a number of data sources, including a credit card fraud identification service, a debit card fraud identification service, credit bureaus, merchant systems, etc. The fraud management system can categorize each fraud case based on a type of transaction or fraud. Each fraud case can be stored in one database of a set of databases based on its assigned category. Each fraud case may also be stored in a central database. Each fraud case can receive an initial priority score generally indicative of its relative priority, risk, importance, and/or urgency. For example, the initial priority score can be assigned by an external source. A set of rules developed by a machine learning model can be used to determine an updated priority score and/or automatically close each fraud case. A highest priority case can be dynamically determined in real-time and assigned to an agent for review. The model can be retrained based on input received from the agent and trends or patterns of the fraud cases.

An example implementation of the fraud management system can be structured to receive and store fraud cases in one or more category queues. Each category queue can be a database corresponding to a category, such as credit card transactions, debit card transactions, online transactions, etc. The fraud management system can be structured to calculate an updated rank or score for each fraud case indicative of its relative priority. For example, a credit card transaction may have been processed with minimal authentication in a foreign country that the account holder has not previously conducted a transaction in. Accordingly, a received fraud case corresponding to the transaction may have an initial priority score of "950" on a 1-1000 scale, indicating a relatively high level of risk. A subsequent credit card purchase by the account holder may be denied by the credit card issuer, for example, because the priority score exceeds a predetermined threshold.

Referring to the above example, the same account holder may have also conducted a debit card transaction, such as an ATM withdrawal, in the foreign country on the same day. If the withdrawal involved an increased level of authentication, and transaction history relating to the debit card indicates previous debit card transactions in the foreign country, then a fraud case for this transaction may be generated with a low priority score, or a fraud case may not be generated at all. In this example, the fraud management system can be structured to receive information relating to the debit card transaction (e.g., authentication, transaction history), and in response, update the priority score of the fraud case associated with the credit card transaction. In particular, the fraud management system can be structured to lower the priority score based on one or more rules developed by a machine learning model. Accordingly, the fraud case may not be reviewed by a fraud agent until other, more urgent fraud cases are first reviewed (i.e., fraud cases with higher priority scores). The fraud management system can be structured to automatically close the fraud case based on an automatic action rule. The prioritization rules and automatic action rules can be developed by a machine learning model. The fraud management system can be structured to receive a disposition for each fraud case for retraining the machine learning model.

Beneficially, systems and methods disclosed herein enable a fraud team to optimize their efforts by dynamically prioritizing fraud cases, such that a highest priority fraud case at a given time can be quickly identified, assigned, and acted on. Fraud cases can be sorted according to an evolving set of prioritization rules generated by a machine learning model using artificial intelligence, thereby allowing current and future patterns of fraudulent activity to be identified faster than current systems. For example, the system can be structured to associate fraud cases received from various data sources to facilitate identifying patterns and other inputs that may be useful for generating the model. The system can also be structured to continuously receive case dispositions for retraining the model. Accordingly, if a fraudster recognizes a novel opportunity to commit fraud (e.g., by exposing an undetected vulnerability), the model can be dynamically retrained to determine rules based on patterns relating to the fraud scheme, enabling a quicker reaction than current systems. For example, a developed rule can be configured to automatically freeze vulnerable accounts to decrease claims and financial losses. The model can also develop rules for identifying and closing fraud cases that present an insufficient risk level, such as a "false positive" fraud case, thereby reducing the number of fraud cases for manual review. Thus, the fraud management system enables a fraud team to optimize available resources by focusing their efforts on the most urgent fraud cases. In some embodiments, the fraud management system can be structured to provide feedback to source groups or teams to adjust prioritization rules and automatic action rules.

Embodiments of the systems disclosed herein improve computer-related technology by performing certain steps that cannot be done by conventional systems or human actors. For example, a fraud management system can include a number of processing circuits structured to analyze data relating to transactions, authentication attempts, travel history, user devices, and other data sources to adjust or generate new data relationships for prioritizing fraud cases. The fraud management system can determine updated priority scores for each fraud case as new input information is received, allowing fraud cases to be dynamically prioritized in real time as fraudulent transactions occur or are initiated by a fraudster. In some implementations, a fraud agent may request a fraud case for manual review at any time (e.g., after reviewing a previous fraud case), and identifying a highest priority case for assignment requires less processing time (e.g., by moving data corresponding to high priority fraud cases to a cache or memory configured for faster data processing and/or transfer, by restructuring or re-associating fraud case data so that the most urgent fraud cases are disposed of before other fraud cases are addressed).

Furthermore, the fraud management system can include a centralized database configured to store fraud cases received from multiple databases, thereby facilitating quicker identification of high priority fraud cases and retrieval of corresponding data. In current systems, fraud cases may be stored in multiple databases, each corresponding to a type of fraud or a source of the fraud case. In these systems, when a fraud agent requests a highest priority case for review, data from multiple databases needs to be retrieved to compare fraud cases and identify a highest priority fraud case. However, the fraud management system disclosed herein can be configured to retrieve fraud case data from a centralized database configured to reorganize and restructure how fraud cases from multiple databases or received from multiple input sources are stored. The fraud management system can be configured to automatically close and remove stored fraud cases, allowing a processing circuit to retrieve and process less data, and thereby decrease the processing time needed to take action on fraud cases.

Referring to FIG. 1, a block diagram of a system 100 is shown according to an exemplary embodiment. As described in further detail herein, the system 100 may generally be structured to facilitate prioritizing and/or reprioritizing fraud cases received from various data sources. The system 100 is shown to include a provider computing system 102. The provider computing system 102 can be associated with a provider institution, such as a bank, a clearing house, or other payment processing institutions.

The provider computing system 102 is generally structured to communicate with external systems over the network 110. In this regard, the network 110 generally provides communicable and operative coupling between the provider computing system 102, the fraud systems 108, the user device 126, and/or other components described herein to provide and facilitate the exchange of communications (e.g., data, instructions, messages, values, commands, etc.). Accordingly, the network 110 may include any network including wired (e.g., Ethernet) and/or wireless networks (e.g., 802.11X, ZigBee, Bluetooth, Wi-Fi, etc.). In some arrangements, the network 110 includes the Internet. In further embodiments, the network 110 includes a proprietary banking network to provide secure or substantially secure communications.

The provider computing system 102 includes a fraud management system 124. The fraud management system 124 can generally be structured to receive data relating to fraudulent or potentially fraudulent activity. For example, the fraud management system 124 can be structured to receive information relating to sets of fraud cases from a number of data sources, such as the fraud systems 108. The fraud management system 124 can also be structured to receive credit card or debit card transaction data from the merchant computing system 104. In some embodiments, the fraud management system 124 is structured to receive information from the user device 126, which can relate to a location, a network connection, interactions with the user interface 156, and/or a type of user device 126.

In some embodiments, the provider computing system 102 includes one or more systems structured to detect potential fraudulent activity in response to received data. For example, transaction data received from the merchant computing system 104 can include information indicative of a potential fraudulent transaction. In this regard, the provider computing system 102 and/or the fraud management system 124 can be structured to generate a fraud case. In some embodiments, the computing system 102 and/or the fraud management system 124 can be structured to calculate a priority score of the fraud case. Although shown as being part of the memory 118, in some arrangements the fraud management system 124 is provided separately from the provider computing system 102. In this regard, the fraud management system 124 can be structured to communicate with the provider computing system 102, the fraud systems 108, and other systems via the network 110.

The provider computing system 102 is shown to include a processing circuit 114 having a processor 116 and a memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 may include one or more memory devices (e.g., RAM, NVRAM, ROM, Flash Memory, hard disk storage) and may store data and/or computer code for facilitating the various processes described herein. Moreover, the memory 118 may be or include tangible, non-transient volatile memory or non-volatile memory. Accordingly, the memory 118 may include database components, object code components, script components, or any other type of information structure for supporting the various activities and information structures described herein.

The provider computing system 102 may include various databases in the memory 118. For example, the provider computing system 102 is shown to include a transactions database 120 and an accounts database 122. Although shown as being part of the memory 118, in some arrangements the transactions database 120 and/or the accounts database 122 are separate components of the provider computing system 102.

The transactions database 120 can be structured to hold, store, categorize, and otherwise serve as a repository for information associated with transactions among consumers and/or business entities. For example, the transactions database 120 can be structured to store information relating to transactions between the merchant computing system 104 and the user associated with the user device 126. Stored transaction information can relate to credit card transactions, debit card transactions, online transactions, transaction history, day and time of a transaction, a location of the transaction, a user name, a business entity name, a merchant category code, and the like.

The accounts database 122 can be structured to hold, store, categorize, and otherwise serve as a repository for information associated with accounts held by persons and/or business entities. In some embodiments, the accounts database 122 is structured to store financial accounts held by a financial institution associated with the provider computing system 102. For example, the accounts database 122 may store financial information relating to a savings account, a checking account, investment accounts, debit card transactions, credit card transactions, and the like. The accounts database 122 may also store information relating to the user, including a legal name, current and former addresses, a government identification number, date of birth, and any other information relating to the user.

In some embodiments, the transactions database 120 and/or the accounts database 122 are structured to selectively provide access to stored information. In this regard, each of the transactions database 120 and the accounts database 122 can be communicably and operatively coupled to the fraud management system 124 and/or the network interface 112. In some embodiments, information stored by the transactions database 120 and/or the accounts database 122 can be selectively retrieved from external systems (e.g., the fraud systems 108, the agent computing terminals 146) via the network interface 112.

The provider computing system 102 further includes a network interface 112, which is used to establish connections with other components of the system 100 by way of the network 110. In this regard, the network interface 112 is structured to include hardware (e.g., Ethernet controller, memory, etc.) and software necessary to facilitate data communications for the provider computing system 102 over the network 110 or directly with an external computing system, such as the agent computing terminals 146. The network interface 112 includes program logic that facilitates connection of the provider computing system 102 to the network 110. The network interface 112 supports communication between the provider computing system 102 and other systems. For example, the network interface 112 can include a cellular modem, a Bluetooth transceiver, a Bluetooth beacon, a radio-frequency identification (RFID) transceiver, and a near-field communication (NFC) transmitter. In some embodiments, the network interface 112 communicates via a secured wired connection. In some arrangements, the network interface 112 includes the hardware and machine-readable media sufficient to support communication over multiple channels of data communication.

Further, in some arrangements, the network interface 112 includes cryptography capabilities to establish a secure or relatively secure communication session with the provider computing system 102. In this regard, data may be encrypted and transmitted to prevent or substantially prevent the threat of hacking.

The agent computing terminals 146 is shown to include a processor 148, a memory 150, a network interface 152, and a user interface 154. The processor 148 and memory 150 can be structured as described herein with reference to the processor 116 and the memory 118, respectively. The network interface 152 can be any suitable network interface, such as described herein with reference to the network interface 112. The user interface 154 can be any suitable interface allowing a user to input and/or view information. In some embodiments, the user interface 154 is a web-based interface. In some embodiments, the agent computing terminals 146 also includes one or more input devices structured to receive a user input, such as a mouse, keyboard, touch-screen, etc. In some embodiments, the agent computing terminals 146 is completely or partially provided with the provider computing system 102. Any number of agent computing terminals 146 can be provided. In this regard, the agent computing terminals 146 can include multiple processors, memories, network interfaces, and user interfaces in some embodiments of the system 100.

Each of the agent computing terminals 146 can be associated with an agent, such as a member of a fraud team responsible for detecting and mitigating fraudulent activity. In some arrangements, each of the agent computing terminals 146 is associated with an employee of an institution that operates the provider computing system 102. In some embodiments, each of the agent computing terminals 146 can be structured to transmit a request to retrieve a fraud case from the fraud management system 124. The fraud management system 124 can be structured to provide information relating to the fraud case to one or more of the agent computing terminals 146 in response to the request, allowing the agent to review details of the fraud case. Each of the agent computing terminals 146 can be structured to transmit a disposition of the fraud case to the fraud management system 124. In some embodiments, each of the agent computing terminals 146 is structured to communicate with one or more components of the system 100 via the network 110. The agent computing terminals 146 are described in further detail with reference to FIG. 2.

The merchant computing system 104 is shown to include a processor 134, a memory 136, and a network interface 138. The processor 148 and the memory 150 can be structured as described herein with reference to the processor 116 and the memory 118, respectively. The network interface 138 can be any suitable network interface, such as described herein with reference to the network interface 112. In some embodiments of the system 100, the merchant computing system 104 is not provided.

The merchant computing system 104 can generally be associated with a business entity, such as a merchant that buys or sells products or services. For example, the merchant computing system 104 can be operated by an online business that sells products to consumers, such as the user associated with the user device 126. In this regard, the merchant computing system 104 can be structured to communicate transaction information, such as a credit card number, a legal name of the user, an address, a merchant category code, and any other information for conducting a transaction. In some embodiments, the merchant computing system 104 is structured to communicate authentication information. Transaction information and/or authentication information can be communicated with the user device 126, the provider computing system 102, and/or the fraud systems 108. Although the merchant computing system 104 is shown to communicate with the user device 126, the provider computing system 102, and/or the fraud systems 108 via the network 110, in other embodiments of the system 100, the merchant computing system 104 can be structured to communicate directly with the user device 126, the provider computing system 102, and/or the fraud systems 108.

The user device 126 is shown to include a processor 128, a memory 130, a network interface 132, and a user interface 156. The processor 128 and the memory 130 can be structured as described herein with reference to the processor 116 and the memory 118, respectively. The network interface 132 can be any suitable network interface, such as described herein with reference to the network interface 112. The user interface 156 can be any suitable interface allowing a user to input and/or view information. For example, in some embodiments, the user device 126 is a smartphone, tablet device, or wearable device, and the user interface 156 is a touch-screen interface of the smartphone, tablet device, or wearable device. In some embodiments of the system 100, the user device 126 is not provided.

The user device 126 can be associated with a user. For example, the user device 126 may allow the user to conduct a transaction with a business associated with the merchant computing system 104. In this regard, the user device 126 can also be structured to facilitate mobile payments, such as through an NFC transceiver and a mobile payment application. In some embodiments, the user device 126 can be structured to receive information via a text or SMS message, an email and/or an alert. For example, the user device 126 can be structured to receive a text message from the provider computing system 102 via the network 110 with information relating to a possible fraudulent transaction. The user device 126 can be structured to display received information to the user via the user interface 156.

The fraud systems 108 is shown to include a processor 140, a memory 142, and a network interface 144. The processor 140 and the memory 142 can be structured as described herein with reference to the processor 116 and the memory 118, respectively. The network interface 144 can be any suitable network interface, such as described herein with reference to the network interface 112. In some embodiments, the fraud systems 108 is structured to communicate information relating to fraudulent activity with the provider computing system 102. Although the fraud systems 108 is shown to include a single processor and memory, in some embodiments of the system 100, multiple processors and memories are provided. In particular, the fraud systems 108 can include multiple systems associated with detecting and/or managing fraudulent transactions.

In some embodiments, the fraud systems 108 includes at least one system associated with detecting and/or managing fraudulent transactions. The fraud systems 108 may include any number of systems, which may be operated by third party entities, the provider computing system 102, and/or an institution associated with the provider computing system 102. In some embodiments of the system 100, one or more of the fraud systems 108 can be partially or completely provided with the provider computing system 102. For example, the fraud systems 108 may include a fraud identification system operated by a third-party entity that monitors credit card transactions to identify potential fraudulent activity, and provide real-time or near real-time information relating to possible fraudulent credit card transactions. In this example, the fraud systems 108 may include a second fraud system operated by the entity of the provider computing system 102 that monitors debit card transactions and provides information relating to possible debit card fraud in batch form. Furthermore, the fraud systems 108 may include a third system operated by an entity that detects fraudulent transactions made over the internet, for example by monitoring a use of a webpage interface, IP addresses, MAC addresses, proxies, firewalls, VPN software, software and hardware configurations, a GPS position, assisted or synthetic GPS data, web traffic data, audio characteristics (e.g., acoustic fingerprinting), etc. Embodiments of the fraud systems 108 may additionally or alternatively include systems associated with check or banking fraud, identity theft, non-fraud claims, online transactions, credit bureaus, and any other information that may be useful for detecting and mitigating fraudulent activity.

In some embodiments, the fraud systems 108 are structured to provide fraud cases to the provider computing system 102. Each fraud case can include a priority score, such as described herein. In some embodiments, the fraud systems 108 and/or the provider computing system 102 is structured to generate a fraud case when potentially fraudulent activity is detected. Each fraud case can include information associated with detecting and mitigating fraudulent activity. For example, information can relate to a person or entity name associated with a transaction, a date and time, a merchant category code, etc. In some embodiments, each fraud case includes information associated with a case disposition, which may correspond to "case closed by agent," "case automatically closed," "case under review," etc.

As described herein, the provider computing system 102 can be structured to receive data relating to fraud cases, for example via the network interface 112. In some embodiments, the provider computing system 102 is structured to pass received fraud case data to the fraud management system 124, along with other data stored in the memory 118 (e.g., data from the transactions database 120 and/or the accounts database 122). In some embodiments, the provider computing system 102 can be structured to scan the transactions database 120 and/or the accounts database 122 in response to received fraud case data. For example, when a received fraud case relates to a transaction of a credit card account, the provider computing system 102 can be structured to scan the transactions database 120 to determine a transaction history of the credit card account. Additionally or alternatively, the provider computing system 102 can be structured to scan the accounts database 122 to determine a credit card account age, for example. The provider computing system 102 can be structured to associate information stored in the memory 118 (e.g., the transactions database 120 and/or the accounts database 122) to a corresponding fraud case and/or provide stored information from the memory 118 to the fraud management system 124.

Figure 2:
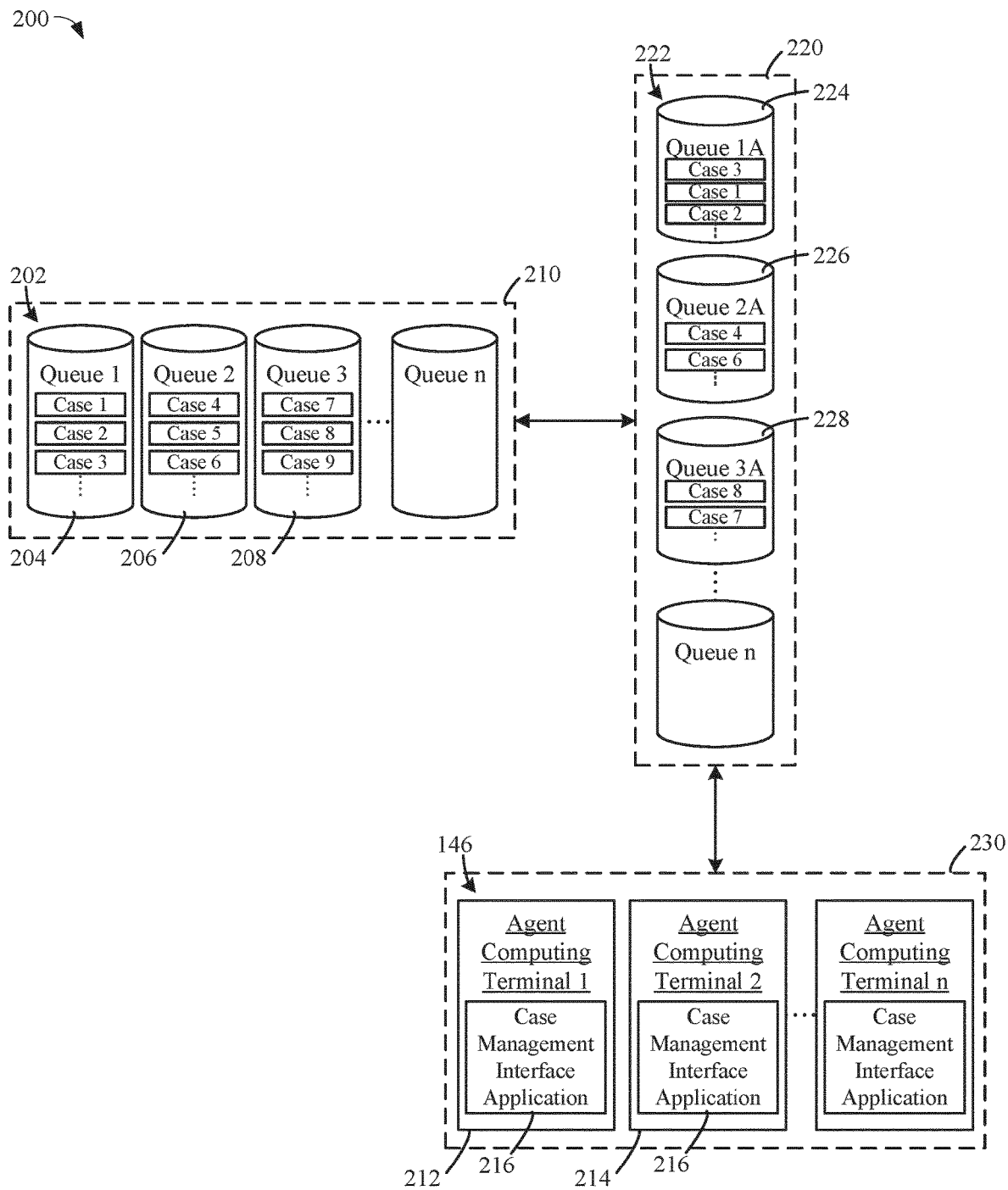
FIG. 2 is flow diagram of a method of sorting fraud cases based on prioritization rules and automatic action rules by the fraud management system of FIG. 1, according to an example embodiment.

Referring to FIG. 2, a flow diagram of a process 200 of sorting fraud cases based on prioritization rules and automatic action rules by the fraud management system 124 of FIG. 1 is shown, according to an example embodiment. It will be appreciated that the process 200 can be performed by one or more components of the system 100 other than or in addition to the fraud management system 124.

At step 210, data relating to fraud cases are received and/or stored in a set of category queues 202. In some embodiments, the fraud management system 124 receives data relating to the fraud cases from the fraud systems 108 and/or the merchant computing system 104. For example, the fraud management system 124 can receive fraud cases via the network interface 112 of the provider computing system 102, as described herein.

The set of category queues 202 is shown to include a first queue 204, a second queue 206, and a third queue 208. Each category queue of the set 202 can correspond to a type of fraudulent activity. For example, the first queue 204 can correspond to credit card transactions, the second queue 206 can correspond to debit card transactions, and the third queue 208 can correspond to online transactions. Any number of category queues can be provided in the set 202. In some embodiments, each category queue of the set 202 corresponds to a specific fraud system of the fraud systems 108. Each category queue of the set 202 can be structured to store any number of fraud cases.

Each fraud case within a category queue of the set 202 can include an initial priority score that is generally indicative of its relative priority, importance, and/or urgency. By ranking each fraud case within a category queue, the fraud management system 124 can identify the highest priority case from a particular category queue. For example, a credit card transaction involving minimal authentication in a foreign country that the account holder has not previously visited may correspond to a fraud case with a high priority score, such as "950" on a 1-1000 scale. The fraud case corresponding to this credit card transaction may be stored in the first queue 204, along with other fraud cases relating to credit card transactions. Another fraud case relating to a debit card transaction (e.g., an ATM withdrawal) may receive a lower priority score of "500" even though the transaction was also processed in a foreign country, because the transaction involved an increased level of authentication and transaction history of the debit card indicates an increased likelihood of travel by the account holder. The fraud case corresponding to this debit card transaction may be stored in the second queue 206, along with other fraud cases relating to debit card transactions.

In this example, the fraud case corresponding to the credit card transaction should generally be reviewed before the fraud case corresponding to the debit card transaction. A priority score can be based on several factors, such as authentication type (e.g., PIN, biometric), a dollar amount, a location of the transaction, whether parties have previously transacted at the location, whether payment is present at the transaction, patterns, etc. In particular, a set of prioritization rules can be configured to determine a priority score using the aforementioned factors and other input parameters as disclosed herein.

Embodiments disclosed herein can use any suitable system to rank or score fraud cases. In one example embodiment, a ranking system can use an algorithm configured to calculate a priority score based on various input parameters. For example, a priority score can be calculated as a summation of input parameter values. In some embodiments, the algorithm can be configured to assign relative weights to input parameter values by associating a multiplier to one or more input parameters. In this regard, an input parameter relating to a higher risk level can cause a corresponding increase of a calculated risk score. Input parameters and/or weights can relate to any factor, such as an instance of a foreign or suspicious credit card transaction, an instance of a foreign or suspicious debit card transaction, a dollar amount, authentication attempts, and other factors disclosed herein.

In one example embodiment, a ranking system can relate to categorizing each fraud case based on a level of risk. The ranking system can have three risk categories, for example, including a first category corresponding to fraud cases with a high risk level, a second category corresponding to fraud cases with a low risk level, and a third category corresponding to fraud cases with a minimal risk level. In this example, a fraud case may be assigned to the first category when the fraud case is associated with multiple indications of fraud (e.g., suspicious transactions in multiple foreign countries with an unverified merchant) and/or of severity (e.g., transactions exceeding a threshold dollar amount). A fraud case may be assigned to the second category when it relates to only one or two indications of fraud, for example. Accordingly, fraud cases of the first category can be assigned and reviewed prior to fraud cases of the second category. A fraud team may determine to not take a responsive action for fraud cases of the third category. In some embodiments, the fraud management system 124 can be structured to automatically close fraud cases of the third category.

At step 220, data corresponding to stored fraud cases of the set 202 are modified to generate a set of restructured category queues 222. The set of restructured category queues 222 is shown to include a queue 224 corresponding to restructured data of the first category queue 204, a queue 226 corresponding to restructured data of the second category queue 206, and a queue 228 corresponding to restructured data of the third category queue 208. In some embodiments, the stored data of the set 202 can be restructured based on prioritization rules and/or automatic-action rules to generate the set 222.

Prioritization rules can be configured for determining an updated priority score based on input parameters as described herein. For example, referring to category queue 204, one or more prioritization rules may have been used to determine an updated priority score for at least one of "case 1," "case 2," and "case 3." Thus, category queue 224 shows "case 3" having a higher priority score than that of "case 1" and "case 2," and stored data can be restructured based on the updated priority score of each of "case 1," "case 2," and "case 3." In this regard, some or all stored data in the category queue 224 can be organized, associated, and/or otherwise stored differently relative to data stored in the category queue 204. For example, stored data corresponding to "case 3" can be identified and moved to a particular memory location (e.g., a cache) to facilitate quicker identification and assignment.

Automatic action rules can be configured for determining an automatic action based on input parameters as described herein. In some embodiments, an automatic action rule can relate to a determination that a fraud case can be automatically closed. For example, referring to the second queue 206, one or more automatic action rules may have been used to determine that "case 5" was a false positive (e.g., a transaction where fraud is sufficiently unlikely). Accordingly, "case 5" can be closed, and stored fraud cases in the category queue 226 does not include "case 5." In this regard, data stored in the category queue 226 can be restructured to no longer include data relating to "case 5."

In some embodiments, both prioritization rules and automatic action rules can be used to adjust data corresponding to stored fraud cases. For example, referring to category queue 208, a prioritization rule may have been used to determine an updated priority score for "case 8" corresponding to a higher priority score relative to "case 7." Furthermore, an automatic action rule may have determined that "case 9" was a false positive and can be closed. Thus, category queue 228 shows "case 8" having a higher priority score than "case 7," and "case 9" is not included in the category queue 228. In this regard, data stored in the category queue 228 can be restructured accordingly as described herein.

Accordingly, step 220 shows how data corresponding to fraud cases stored in the set of category queues 202 can be modified based on prioritization rules and/or automatic action rules to generate the set of restructured category queues 222. In this regard, higher priority fraud cases can be quickly identified for assignment. For example, although each category queue of the restructured set 222 is shown to include three cases, in some implementations a category queue may store tens, hundreds, or thousands or more fraud cases. Accordingly, identifying fraud cases for assignment can require less processing time by a processor (e.g., by moving corresponding data to a cache or memory configured for faster data processing and/or transfer). Furthermore, some fraud cases that do not require manual review by a fraud team can be identified and automatically closed. In this regard, processing time can be decreased (e.g., when reprioritizing cases or assigning a highest priority case) because data corresponding to the closed cases no longer needs to be retrieved and processed. In some embodiments, step 220 involves storing fraud cases in a central database. For example, fraud cases of each queue in the set 222 can be stored in a central database, which can be structured to sort fraud cases based on updated priority scores. By storing fraud cases in a central database, priority scores of fraud cases across all category queues of the set 222 can be quickly identified and/or compared.

At step 230, one or more fraud cases (e.g., a highest priority fraud case) can be assigned to one or more of the agent computing terminals 146. Any number of agent computing terminals 146 can be provided. Herein, assigning a fraud case to an agent computing terminal refers to assigning a fraud case to an agent computing terminal, for example, by assigning the fraud case to the agent that uses the agent computing terminal. As described herein, the agent can be a member of a fraud team or someone who is generally responsible for reviewing fraud cases and/or determining a responsive action. In some examples, it is assumed that each of the agent computing terminals 146 is uniquely associated with an agent. In this regard, assigning fraud cases may be dynamic such that if the agent becomes associated with a different agent computing terminal of the agent computing terminals 146, then fraud cases for assignment to the agent can follow the agent to the new agent computing terminal.

Each of the agent computing terminals 146 is shown to include a case management interface application 216. The case management interface application 216 can be structured to assist an agent in reviewing fraud cases and implementing a responsive action for each fraud case. In this regard, the case management interface application 216 can be communicably coupled to the provider computing system 102, the fraud management system 124, the user device 126, the fraud systems 108, and/or the merchant computing system 104.

The case management interface application 216 may be downloaded by the agent computing terminals 146 prior to its usage, hard coded into the memory of each of the agent computing terminals 146, or accessible as a web-based interface application such that an agent accesses the case management interface application 216 via a web browsing application. In this latter instance, the case management interface application 216 may be supported by a separate computing system including one or more servers, processors, network interface circuits, etc., that transmit applications for use to each of the agent computing terminals 146.

In certain embodiments, the case management interface application 216 includes an application programming interface (API) and/or a software development kit (SDK) that facilitates the integration of other applications.

As described herein, each of the agent computing terminals 146 can be associated with one or more category queues of the set 222. For example, the first agent computing terminal 212 can be associated with a first group of the set 222, such as the category queue 224 and the category queue 228. Accordingly, the first agent computing terminal 212 may be structured to receive cases only from the category queue 224 and the category queue 228 (e.g., via the case management interface application 216). This may be desirable because the agent operating the first agent computing terminal 212 may have relevant expertise relating to the fraud categories associated with the category queue 224 and with the category queue 228. In this example, the second agent computing terminal 214 can be associated with a second group, such as category queue 226 and category queue 228. Accordingly, the agent operating the second agent computing terminal 224 may only be presented fraud cases from the category queue 226 and the category queue 228. Further details of these interactions are provided herein with reference to FIG. 5.

Figure 3:
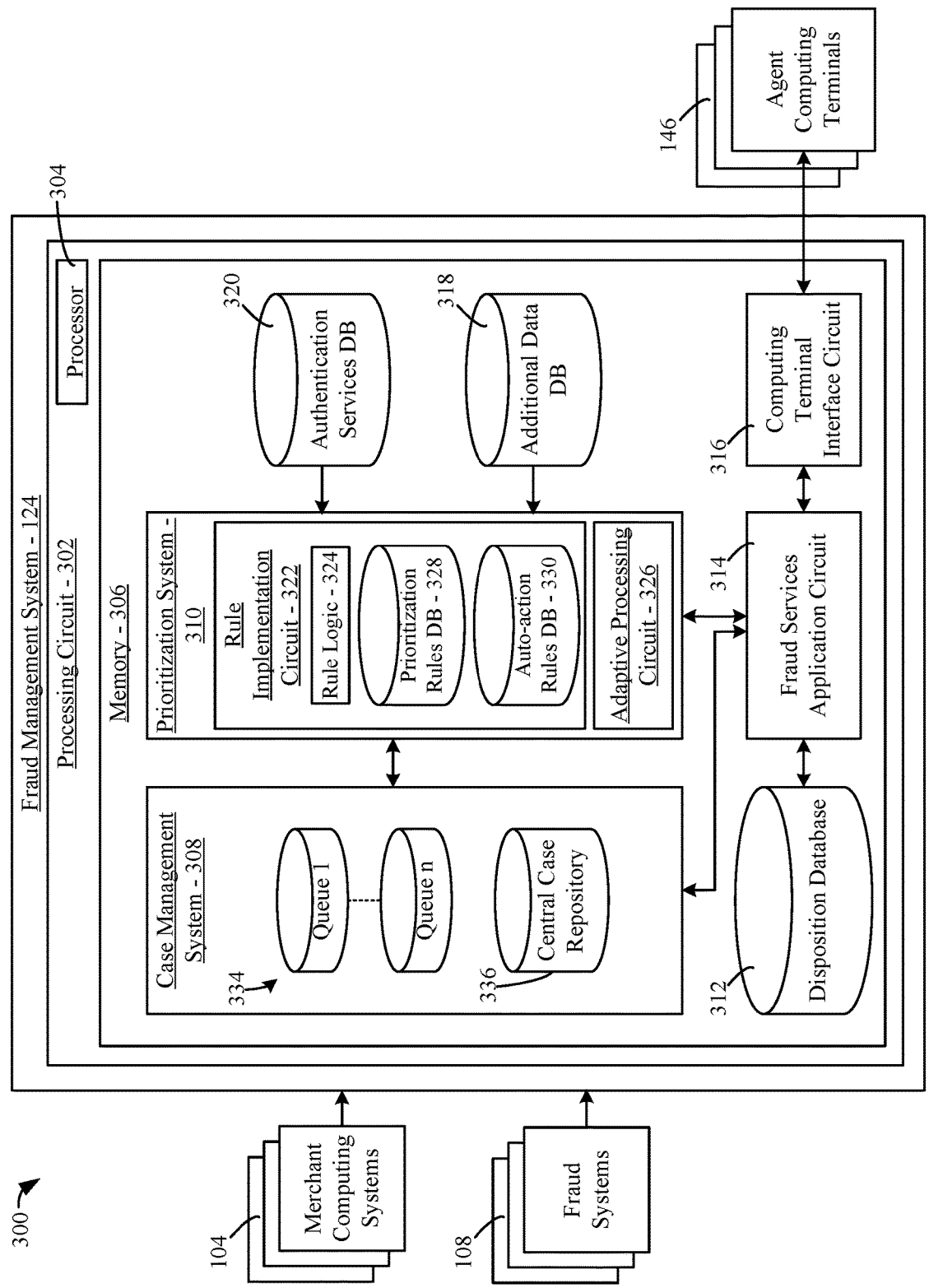
FIG. 3 is a diagram showing the fraud management system of FIG. 1 in greater detail, according to an example embodiment.

Referring to FIG. 3, a block diagram showing a more detailed view of the fraud management system 124 is shown, according to an example embodiment. The system is shown to include the fraud management system 124, the merchant computing system 104, the fraud systems 108, and the agent computing terminals 146. In some implementations, the fraud management system 124 is partially or completely provided with the provider computing system 102 as described with respect to FIG. 1. For example, the fraud management system 124 or one or more components of the fraud management system 124 may be included in the memory 118 of the provider computing system 102. In other implementations, the fraud management system 124 may be provided as a separate component of the provider computing system 102.

The fraud management system 124 can be structured to communicate data between the merchant computing system 104, the fraud systems 108, and/or the agent computing terminals 146, such as described herein with reference to FIGS. 1 and 2. In some embodiments, the fraud management system 124 can be structured to receive information relating to fraud cases from the fraud systems 108 (e.g., via the network interface 112 of the provider computing system 102). In other implementations, whereby the fraud management system 124 is provided as a separate component of the provider computing system 102, the fraud management system 124 may be structured to receive data via another network interface. Received information can be communicated via the network 110 or any other suitable wired or wireless networks.

The fraud management system 124 is shown to include a processing circuit 302 having a processor 304 and a memory 306. The processor 304 and the memory 306 can be structured as the processor 116 and the memory 118, respectively, as described herein with reference to FIG. 1. The memory 306 is shown to include a case management system 308, a prioritization system 310, a fraud services application circuit 314, a computing terminal interface circuit 316, a disposition database 312, an authentication services database 320, and an additional data database 318. As described herein in further detail, the fraud services application circuit 314 can generally be structured to manage and facilitate communication of the components of the system 100, including the fraud management system 124.

The case management system 308 can be structured to store fraud cases in the set of category queues 334 and a central case repository 336. The set of category queues 334 can correspond to the set of category queues 202 and/or the set of restructured category queues 222 as described herein. In some embodiments, the central case repository 336 is structured to store information relating to each fraud case, such as information relating to a particular category queue the fraud case was retrieved from, an existing priority score, an updated priority score, transactional information, machine learning information, and any other information useful for managing fraud cases. In some embodiments, the central case repository 336 corresponds to the set of restructured category queues 222.

In some embodiments, the fraud services application circuit 314 is structured to facilitate updating the set of category queues 334 and the central case repository 336 in response to receiving fraud cases from the fraud systems 108. The fraud services application circuit 314 can be structured to provide an instruction to the case management system 308 to store each fraud case in one category queue of the set 334, such as described herein. For example, the fraud services application circuit 314 or the case management system 308 can be structured to direct fraud cases relating to credit card transactions to a category queue associated with credit card transaction cases, direct fraud cases relating to debit card transaction cases to a category queue associated with debit card transaction cases, and so on. In this regard, the fraud services application circuit 314 or the case management system 308 can be structured to determine which category queue of the set 334 the fraud case is to be stored in. For example, the fraud services application circuit 314 can be structured to determine a particular category queue for storing a fraud case based on the source of the fraud case. Additionally or alternatively, the fraud services application circuit 314 can be structured to determine a particular category queue for storing a fraud case based on received information. For example, a fraud case received from the fraud systems 108 can include an indication that the fraud case relates to a credit card transaction. Accordingly, the fraud services application circuit 314 can be structured to route the received fraud case to the category queue associated with credit card transactions.

In some embodiments, the case management system 308 can be structured to facilitate storage of fraud cases in the central case repository 336. For example, the case management system 308 can be structured to store a fraud case in the central case repository 336 in response to storing the fraud case in a category queue of the set 334. In this regard, the case management system 308 can be structured to facilitate communication of fraud case data among the set of category queues 334, the central case repository 336, and other components of the fraud management system 124. In some embodiments, the fraud services application circuit 314 is structured to perform one or more functions of the case management system 308.

In some embodiments, the fraud services application circuit 314 can be structured to provide the case management system 308 a priority score or rank associated with each fraud case. In this regard, the case management system 308 can be structured to update the set of category queues 334 and/or central case repository 336 to include the priority score associated with each fraud case. In some embodiments, received fraud cases (e.g., from the fraud systems 108) may include an initial priority score, and the fraud services application circuit 314 can be structured to provide the case management system 308 with the initial priority score included with the received fraud cases. In some embodiments, the fraud services application circuit 314 is structured to receive an initial priority score from a component of the fraud management system. For example, the rule implementation circuit 322 can be structured to determine an initial priority score based on the prioritization rules and the rule logic 324.

The disposition database 312 can be structured to store disposition information related to fraud cases. As used herein, the term "disposition" refers to a responsive action corresponding to a fraud case. In some embodiments, disposition information can relate to a priority de-escalation. For example, after reviewing a fraud case, an agent may conclude that a fraud case can be closed in response to determining the risk of fraud is sufficiently low. The disposition information in this example may relate to an indication that the fraud case was closed by the agent. Disposition information can also relate to a priority escalation. For example, after reviewing a fraud case, an agent may conclude that a fraud case requires opening a claim, closing an account, and/or initiating communication to law enforcement. In some embodiments, a disposition can relate to an automatic action, such as an indication that a fraud case was automatically closed in response to a determination that the risk of fraud is sufficiently low.

In some embodiments, the disposition database 312 is structured to store disposition information received from the fraud systems 108. In some embodiments, the disposition database 312 is structured to store disposition information received from the fraud services application circuit 314. For example, the fraud services application circuit 314 can be structured to receive a disposition provided by an agent associated with one of the agent computing terminals 146. In this example, the agent may have determined that a fraud case can be closed, and the disposition can include an indication of that the agent determined to close the fraud case. As described herein, the fraud services application circuit 314 can be structured to receive disposition information provided by the agent via the computing terminal interface circuit 316.

The prioritization system 310 is shown to include a rule implementation circuit 322 and an adaptive processing circuit 326. The rule implementation circuit 322 and the adaptive processing circuit 326 of the prioritization system 310 can generally be structured to receive input information from any number of data sources, such as the case management system 308, the authentication services database 320, the additional data database 318, the fraud services application circuit 314, etc. In some embodiments, the fraud services application circuit 314 is structured to manage the flow of input information to the prioritization system 310. For example, the fraud services application circuit 314 can be structured to retrieve information stored in the disposition database 312 and pass stored information to the prioritization system 310.

The rule implementation circuit 322 is shown to include rule logic 324, a prioritization rules database 328, and an automatic action rules database 330. The rule logic 324 is generally configured to determine a responsive action for one or more fraud cases of the case management system 308 in response to input information received from any data source (e.g., a component of the system 100). For example, in some embodiments, the rule logic 324 is configured to use artificial intelligence processing to determine a responsive action as described herein. A responsive action can include determining an updated priority score and/or determining an automatic action. The updated priority score can relate to a higher, a lower, or the same priority score relative to the initial priority score. An updated priority score can be determined according to at least one prioritization rule stored in the prioritization rules database 328, and an automatic action can be determined according to at least one automatic action rule stored in the automatic action rules database 330. In some embodiments, one or more of the stored prioritization rules and/or automatic action rules relate to a predetermined and/or pre-programmed rule. The rule logic 324 can be configured to apply received input information to the prioritization rules and automatic action rules to determine a particular responsive action.

In some embodiments, prioritization rules and/or automatic action rules are determined according to one or more models (e.g., machine learning models) and/or artificial intelligence processing. Different models can be selected and used based on certain characteristics of the transaction in question. For example, models can be based on whether a debit card is present for the transaction, whether a credit card is present for the transaction, whether a user is present at a merchant location during the transaction, economic models, and/or any other model type that may be useful for prioritizing fraud cases. Any type and number of models can be applied to fraud cases. For example, for a set of fraud cases where each fraud case involves a debit card being present and a user being present for the corresponding transaction in question, a first model based on the presence of a debit card can be applied to the set of fraud cases, and a second model based on the presence of a user at a merchant location during the transaction can also be applied to further process and filter the fraud cases.

Many combinations of models, rules, and data are possible in various embodiments, as described herein. For example, a prioritization rule or model can be configured to increase a priority score of a fraud case relating to a transaction outside a zip code associated with a residence of the account holder. In some embodiments, the updated prioritization score value can be based on an algorithm corresponding to a relative distance of the transaction. In this regard, the updated prioritization score value can be progressively decreased according to the algorithm as the relative distance increases. In other embodiments, a prioritization rule can be additionally or alternatively based on other input parameters, such as an authentication process (e.g., 3-D Secure, provision attributes from a token database), a transaction dollar amount, etc.

In another example embodiment, a model or rule can relate to whether an account holder has successfully completed an authorized transaction with a particular merchant within a predetermined time period and/or for a particular dollar amount. In this regard, an automatic action rule can relate to closing a corresponding fraud case in response to information received from the transactions database 120 or any other data source of the system 100.

In another example embodiment, a rule can relate to comparing information of a fraud case to fraud cases stored in one or more specific category queues of the set 334. For example, category queue 204 may relate to fraud cases having a specific characteristic, such as a requirement relating to a particular type of review or response. In this regard, information of fraud cases stored in other category queues of the set 334 and/or fraud cases received from other data sources may be compared to information of fraud cases in the category queue 204. For example, compared information can relate to an identical account holder, merchant, or transaction type. A rule may be configured to determine a responsive action based on the comparison. Based on the comparison, a prioritization rule can be configured to adjust a priority score of a received fraud case and/or an automatic action rule can be configured to automatically assign the fraud case to a particular fraud agent.

In some embodiments, an automatic action relates to automatically closing a fraud case. For example, one automatic action rule can be configured to close a fraud case when its updated priority score falls below a certain threshold. In some embodiments, the automatic action can relate to automatically closing or freezing an account based on a corresponding automatic action rule. For example, a rule can be configured to close or freeze a credit card account as a precautionary measure in response to a series of atypical transactions associated with a credit card account. In some embodiments, the automatic action can relate to an authentication and/or authorization action, such as automatically transmitting a SMS or email message to a user or business entity. For example, a rule can be configured to send a SMS message with a request to confirm a recent transaction and automatically close the fraud case based on the response.

In some embodiments, a prioritization rule can be configured to initially determine an updated priority score of the fraud case, and the automatic action rule can be configured to subsequently determine an automatic action in response to the updated priority score. For example, a prioritization rule may relate to a determination of an updated priority score having a lower value. An automatic action rule may relate to determining a responsive action based on a comparison of the updated priority score to a threshold value, such as automatically closing a fraud case when the updated priority score falls below a threshold value.

Input information can be received from any source, including any component of the system 100. In some embodiments, input information can be received from the authentication services database 320. The authentication services database 320 can be structured to store information relating to an authentication process. For example, the authentication services database 320 can be structured to store information relating to an instance or history of authentication attempts directed to a particular person. Stored information can relate to whether the authentication was successful, a time and date, a type of authentication, a location, and the like. Types of authentication can relate to a one-time passcode authentication, hard and soft tokens, biometric data (e.g., voice, fingerprint, facial, iris, behavioral), geography information, audio analysis, user name and password, and any other type of authentication processes.

In some embodiments, input information can be received from the additional data database 318. In some embodiments, the additional data database 318 can be structured to store information relating to transaction history, payment token vaults, and/or travel characteristics. Travel characteristics can relate to an instance or a history of travel of a person or entity. For example, travel characteristics information can include an indication that a particular person or an employee of a business has travelled to a particular foreign country at a particular frequency (e.g., once a week, every other month, once per year). In some embodiments, the travel characteristics can be automatically determined based on a transaction history (e.g., credit card, debit card, check) of a person, a location of a device associated with the person, personal data (e.g., emails, conversations, text messages), etc.

In some embodiments, the rule implementation circuit 322 is configured to transmit an indication of the determined responsive action to the fraud services application circuit 314. In this regard, the fraud services application circuit 314 can be structured to receive and implement the determined responsive action. For example, the fraud services application circuit 314 can be structured to provide an updated priority score to the case management system 308 for storage in the central case repository 336 and/or a corresponding category queue of the set 334. The fraud services application circuit 314 can also be structured to update the case management system 308 to indicate a case has been automatically closed. In this regard, the fraud services application circuit 314 can be structured to update the disposition database 312 to indicate the case has been closed.

The adaptive processing circuit 326 can generally be structured to facilitate prioritizing fraud cases, for example using artificial intelligence processing and/or machine learning techniques as described herein. For example, in some embodiments, the adaptive processing circuit 326 can be structured to generate a machine learning model based on training information. In this regard, the prioritization system 310 can be structured to develop and/or revise the prioritization rules stored in the prioritization rules database 328 and/or automatic action rules stored in the automatic action rules database 330 based on the generated machine learning model. In some embodiments, the adaptive processing circuit 326 is structured to retrain the machine learning model. The adaptive processing circuit 326 is described in further detail with reference to FIGS. 6 and 7.

In some embodiments, the fraud services application circuit 314 is structured to coordinate a schedule of the rule implementation circuit 322 and/or the adaptive processing circuit 326. In an example embodiment, the fraud services application circuit 314 can be structured to identify a batch of fraud cases from the case management system 308 and provide the batch of fraud cases to the rule implementation circuit 322 and/or the adaptive processing circuit 326 to determine an updated priority score for each of the fraud cases. In other embodiments, the fraud services application circuit 314 can be structured to provide fraud cases to the rule implementation circuit 322 and/or the adaptive processing circuit 326 in real-time or near real-time as fraud cases are received from the fraud systems 108.

The computing terminal interface circuit 316 can be structured to generate a user interface for display by the agent computing terminals 146. In some embodiments, the generated user interface is provided by the case management interface application 216 as described herein with reference to FIG. 2. For example, the computing terminal interface circuit 316 can be structured to generate a user interface of the case management interface application 216 configured to receive a user input relating to a request to return a highest priority fraud case. In this regard, the computing terminal interface circuit 316 can be structured to transmit the received request to the fraud services application circuit 314. The computing terminal interface circuit 316 can be structured to generate a user interface containing information relating to the highest priority fraud case. In some embodiments, the computing terminal interface circuit 316 is structured to generate a user interface capable of receiving information relating to a disposition of a fraud case.

Figure 4:
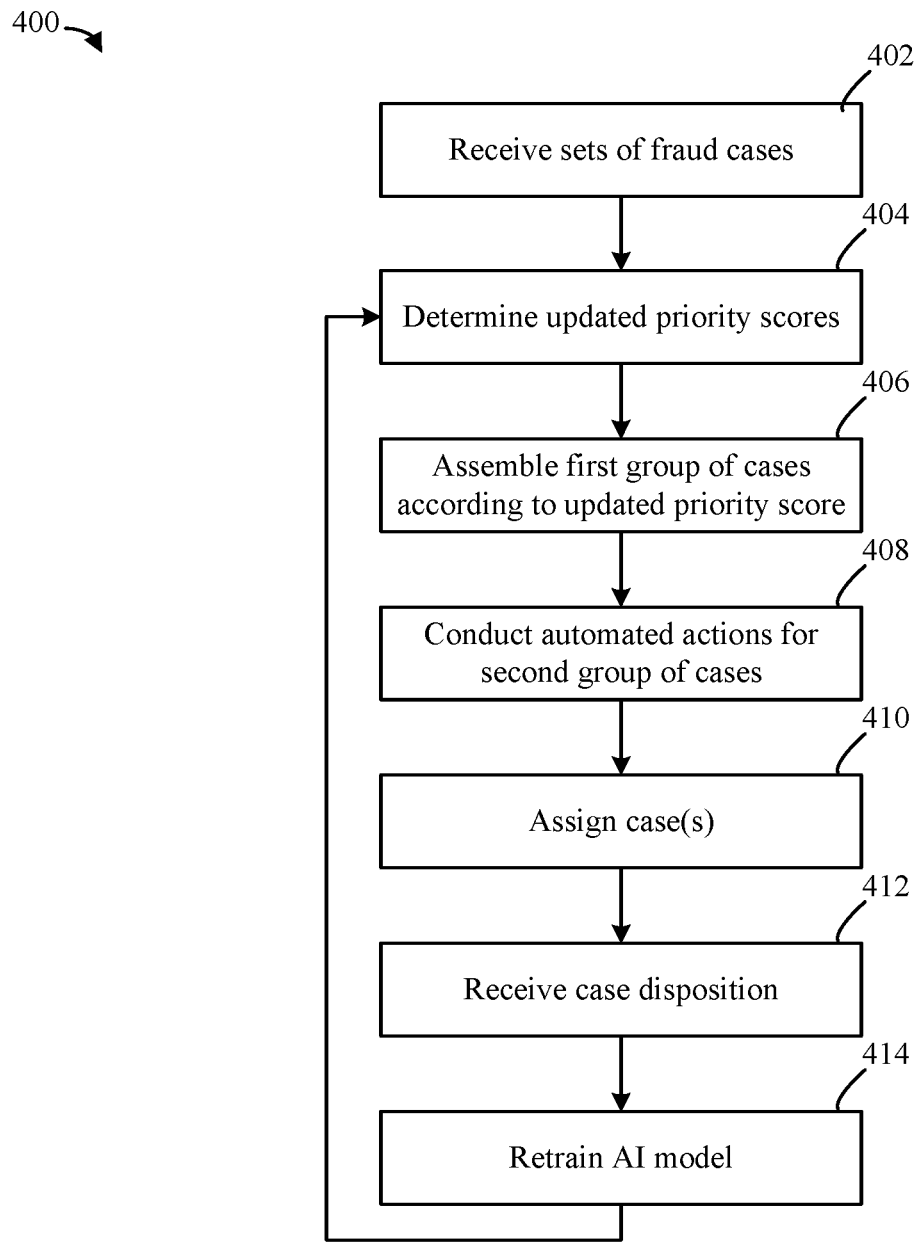
FIG. 4 is a flow diagram of a method of prioritizing fraud cases, according to an example embodiment.

Referring to FIG. 4, a flow diagram of a method 400 of prioritizing fraud cases is shown according to an example embodiment. In some embodiments, the method 400 is performed by the provider computing system 102. In particular, the method 400 may be at least partially performed using the fraud management system 124. The method 400 can begin in response to a trigger event. In some embodiments, a trigger event can be associated with reoccurring time period. For example, the sets of fraud cases can be received (step 402) once per day, hour, week, etc. In some embodiments, a trigger event can be associated with receiving information relating to a potentially fraudulent transaction, for example a fraud case with a priority score exceeding a predetermined threshold.

At step 402, sets of fraud cases are received. The sets of fraud cases can be received from the fraud systems 108. In some embodiments, the sets of fraud cases are received from multiple sources. For example, one set of fraud cases can relate to a category corresponding to credit transactions, and another set of fraud cases can relate to a category corresponding to debit card transactions. In some embodiments, the fraud cases are received from the provider computing system 102, which may create one or more fraud cases in response to transaction data received from the merchant computing systems 104. In some embodiments, the fraud cases are received in batches.

In some embodiments, each fraud case of the set of fraud cases includes transaction data and an initial priority score. Transaction data can relate to a type of transaction (e.g., credit card, debit card, check), a legal name, a business entity, a date and time, a merchant category code, and any other information associated with a transaction. The initial priority score can be a numerical value indicative of a relative priority, risk importance, and/or urgency of its corresponding fraud case.

In some embodiments, the fraud cases are categorized by transaction type and stored in a database (e.g., the category queues 334) corresponding to the transaction type. For example, fraud cases associated with credit card transactions can be stored in one category queue and fraud cases associated with debit card transactions can be stored in another category queue. In some embodiments, the sets of fraud cases are additionally or alternatively stored in a central case repository (e.g., the central case repository 336). In this regard, each fraud case stored in the central case repository can include an indication relating to one or more databases the fraud case is additionally stored in.

At step 404, an updated priority score(s) is determined for one or more of the received fraud cases. In some embodiments, the updated priority score is determined in batches. In some embodiments, the updated priority score is determined using case prioritization data. The case prioritization data can include prioritization rules developed by an artificial intelligence or machine learning model. The rules can be developed using a supervised machine learning model or an unsupervised machine learning model. Any machine learning model can be used, such as a naïve Bayes, classification, a linear regression, a logistic regression, dimension reduction, etc. In some embodiments, a classification model can be initially used to associate each fraud case with a first group of fraud cases or with a second group of fraud cases.

At step 406, a first group of cases is assembled according to the updated priority score. In some embodiments, the first group of cases includes fraud cases for assignment to one or more fraud agents. The first group of cases can be associated with one or more databases (e.g., the set of category queues 334 and/or the central case repository 336). In some embodiments, the first group of cases are sorted in a database based on the updated priority score of each case. In some embodiments, the first group of cases includes a highest priority case having a highest priority score.

At step 408, a second group of cases is assembled. Each case of the second group of cases generally is associated with an automatic action. In some embodiments, the automatic action can be based on the case prioritization data, such as one or more automatic action rules. Embodiments can include any type of automatic action based on any number of automatic action rules. In some embodiments, the automatic action rule is determined based on an AI or machine learning model.

In some embodiments, an automatic action relates to automatically closing a fraud case. For example, one example rule can be configured to close a fraud case when its updated priority score falls below a certain threshold. In some embodiments, the automatic action can relate to automatically closing or freezing an account based on a rule. For example, a rule can be configured to close or freeze a credit card account as a precautionary measure in response to a series of atypical transactions associated with the credit card account. In some embodiments, the automatic action can relate to an authentication and/or authorization action, such as automatically transmitting a SMS or email message to a user or business entity. For example, a rule can be configured to send a SMS message with a request to confirm a recent transaction. In this regard, the rule can be further configured to automatically close the case based on the response.

Referring to steps 404-408 in further detail, example embodiments are described as follows. In one example embodiment, a rule can be based on travel characteristic information corresponding to an account holder or a person associated with an account. In some embodiments, travel characteristic information is stored in the additional data database 318. Travel characteristic information can include an indication of travel provided by the account holder. In an example embodiment, an indication of travel can relate to a debit or checking account held by the account holder. The account holder may have provided the indication of travel to a provider institution (e.g., associated with the provider computing system 102 and/or with the fraud systems 108). The fraud management system 124 may subsequently receive a fraud case regarding credit card transactions in the same foreign country by the same account holder. The transactions may correspond to a credit card account issued by a credit card provider. Because the credit card provider has not received the indication of travel, subsequent credit card transactions may be denied, even though fraudulent activity has not occurred.

In this example, the fraud management system 124 may apply a rule configured to determine an updated a priority score and/or automatically close the fraud case. In particular, the rule can be configured to apply travel characteristic information received from the additional data database 318 or any other data source to update an initial priority score of the fraud case. The rule can correspond to an algorithm that decreases the priority score by a particular value or percentage. For example, the updated priority score can be a value corresponding to a hypothetical situation whereby the indication of travel had been originally provided to the credit card provider. The rule can be configured to determine to close a fraud case when its updated priority score falls below a threshold value.

In some embodiments, a rule can be configured to update the priority score based on authentication information (e.g., received from the authentication services database 320). Referring to the above example, the rule can be configured to further decrease the priority score when the indication of travel was provided with a level of authentication. The rule can correspond to an algorithm that decreases the priority score by a value or percentage commensurate with the level of authentication. In this regard, an updated priority score will be lower for stronger authentication processes. For example, an updated priority score can be a lower value when a PIN code and a date of birth is provided during an authentication process, rather than just a date of birth.

In another example embodiment, a rule be based on a determined indication of travel. For example, a first debit card transaction in a foreign country may have been approved because the debit card transaction involved a sufficient level of authentication (e.g., a PIN code at an ATM machine). In existing systems, subsequent debit card transactions and/or credit card transactions with insufficient authentication may be denied, and one or more generated fraud case may be received by the fraud management system 124 even though fraudulent activity has not occurred.

In this example embodiment, a determination of an indication of travel can be provided as an input to one or more rules. In this regard, the fraud management system 124 may determine an indication of travel in response to receiving information from the transactions database 120, the authentication services database 320, and/or any other data source of the system 100. For example, location information relating to the first debit card transaction can be received from the transactions database 120, and authentication information relating to the first debit card transaction can be received from the authentication services database 320.

Accordingly, the fraud management system 124 may determine an indication of travel and store the indication of travel (e.g., in the additional data database 318). The fraud management system 124 may apply a rule configured to determine that subsequent debit card transactions and/or credit card transactions should no longer be denied due to insufficient authentication. The rule can also be configured to determine an updated priority score and/or automatically close related fraud cases. For example, the rule can correspond to an algorithm configured to decrease a priority score by a particular value or percentage as described herein.

In another example embodiment, a rule be configured to determine an updated priority score and/or automatically close the fraud case based on information relating to a merchant or business entity associated with a transaction. For example, a credit card transaction with a foreign business entity may be initially declined, even though fraudulent activity has not occurred. In existing systems, a fraud case may be generated requiring the account holder to authorize the credit card transaction, for example by a phone call to the credit card provider. However, for reoccurring payments to the foreign business entity (e.g., a continuing service payable each month), the account holder may need to individually authorize each credit card transaction.

In this example, the fraud management system 124 may apply a rule configured to determine an updated a priority score and/or automatically close the fraud case based on a merchant table or record. In this regard, the fraud management system 124 may generate and store (e.g., in the additional data database 318, the transactions database 120) a merchant table corresponding to the account holder and the foreign business entity. The fraud management system 124 may update the merchant table to include information relating to each transaction, such as a transaction amount, a date and time, an authentication process, etc. The fraud management system 124 may apply a rule configured to determine that subsequent credit card transactions should no longer be denied based on previously authorized transactions in the merchant table. The rule can also be configured to determine an updated priority score and/or automatically close related fraud cases. For example, the rule can correspond to an algorithm that decreases a priority score by a particular value or percentage as described herein.

In another example embodiment, a rule can be configured to determine an updated priority score and/or an automatic action based on non-transactional information. For example, an indication of travel can be determined based on non-transaction information relating to audio analysis of a phone call by the account holder. In this example, audio analysis such as "acoustic fingerprinting" can be applied to a phone call. The fraud management system 124 may determine an indication of travel and store the indication of travel (e.g., in the additional data database 318) based on the audio analysis. The fraud management system 124 can also receive and store authentication information (e.g., in the authentication services database 320) relating to the phone call. A rule can correspond to an algorithm that adjusts a priority score by a particular value or percentage based on the indication of travel and/or authentication processes. In this regard, a rule can be configured to automatically close and/or adjust a priority score of subsequently received fraud cases.

A rule can be configured to use any type of non-transactional information for determining an updated priority score and/or an automatic action. In some embodiments, an indication of travel of an account holder can be determined based on a user device (e.g., the user device 126) associated with the account holder, such as information relating to a cellular network connection of the user device, a Wi-Fi connection, IP addresses, MAC addresses, proxies, firewalls, VPN software, software and hardware configurations, a GPS position, assisted or synthetic GPS data, web traffic data, etc.

A rule can be configured to determine an updated priority score and/or automatic action with non-transactional information in any suitable manner. For example, a rule can be configured based on a response to an automatically initiated communication to the account holder. In this regard, the fraud management system 124 may send a SMS message to the user device 126 with a request to verify travel characteristic information and/or authorize a transaction. In some embodiments, the rule can be configured to apply received information to determine an automatic action. For example, a rule can be configured to automatically close a fraud case if received information provides an indication of travel. In some embodiments, the rule can be configured to apply received information to determine an updated priority score. For example, if received information indicates a transaction is not authorized, a rule can be configured to increase a priority score.

At step 410, cases are assigned. In some embodiments, one or more fraud case of the first group of cases is assigned to an agent for review. For example, the highest priority case having a highest priority score can be assigned to an agent, such as described in further detail with reference to FIG. 5. In some embodiments, the highest priority case is assigned in response to a request received from an agent computing terminal (e.g., one of the agent computing terminals 146).

In some embodiments, step 410 involves assigning one or more fraud cases corresponding to various priority score levels. An example embodiment can involve twenty high priority fraud cases (e.g., fraud cases having a priority score exceeding a first threshold value) and twenty low priority fraud cases (e.g., fraud cases having a priority score below a second threshold value) and twenty medium priority fraud cases (e.g., fraud cases having a priority score between the first threshold value and the second threshold value). When two fraud agents request assignment of fraud cases, step 410 can involve assigning the ten high priority fraud cases, the ten medium priority fraud cases, and the ten low priority fraud cases to each of the two agents, for example. By dividing the high priority fraud cases among the fraud agents, the high priority fraud cases can be simultaneously reviewed and addressed faster than by allocating all the high priority fraud cases to a single fraud agent.

In some embodiments, one or more fraud case of the second group of cases is assigned to an agent for review. For example, in some arrangements it may be desirable for a fraud agent to review the automatic action to determine whether an automatic action for a particular case was suitable. In this regard, an indication of the determination can be used at step 414 to retrain the model.

At step 412, at least one case disposition is received. A case disposition can be associated with each fraud case. In some embodiments, a batch of case dispositions is received. For example, one or more case dispositions can be received from third-party systems (e.g., the fraud systems 108). In some embodiments, at least one case disposition relates to an input received from a fraud agent in response to reviewing a fraud case (e.g., via one of the agent computing terminals 146). In particular, a case disposition can relate to an outcome or determination based on the review. In this regard, a case disposition can be received in real-time or near real-time.

A case disposition can relate to closing a fraud case, closing an account associated with the fraud case, opening a claim, communicating to a person or business entity, gathering additional data, reassigning the case to another agent, and the like. In some embodiments, a case disposition can include information relating to an authentication process. In some embodiments, a case disposition associated with the second groups of cases is received. In this regard, a case disposition can relate to a corresponding automatic action. In some embodiments, each case disposition is stored in a database.

At step 414, the AI model is retrained. In some embodiments, the AI model is retrained using case dispositions received at step 412. For example, the AI model can be retrained using the input received from a fraud agent in response to reviewing a fraud case. In some embodiments, the AI model is retrained according to a review of automatic actions associated with the second group of fraud cases. Step 414 is described in further detail with reference to FIGS. 6 and 7.

Figure 5:
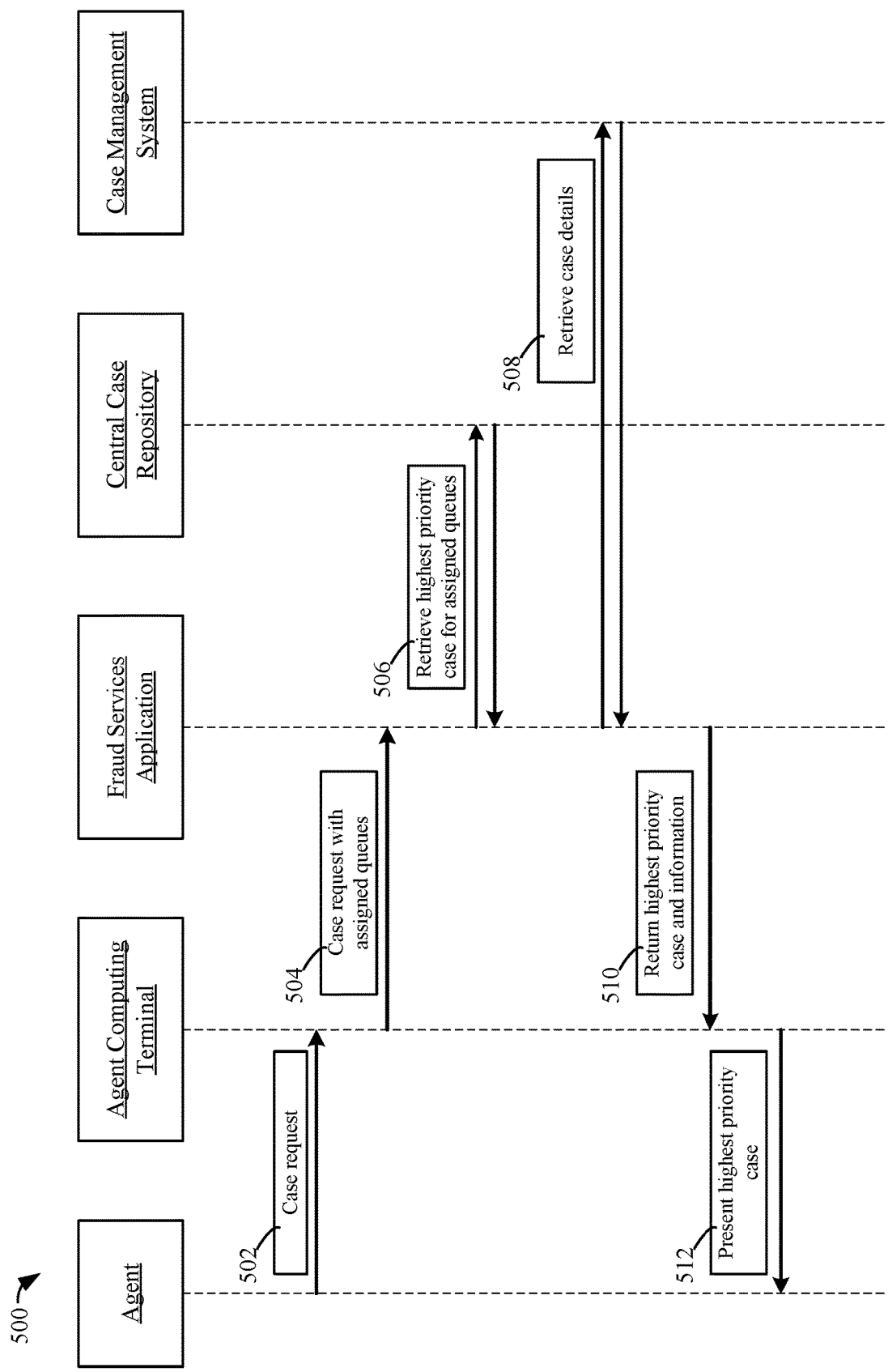
FIG. 5 is a flow diagram of a method of assigning a fraud case, according to an example embodiment.

Referring now to FIG. 5, a process 500 for assigning a priority case is shown, according to an example embodiment. At step 502, an agent provides a case request generally relating to a request to retrieve a fraud case. The agent can be associated with an agent computing terminal (e.g., one of the agent computing terminals 146). In some embodiments, the agent computing terminal corresponds to an assignment of one or more of the category queues 334. In some embodiments, the agent computing terminal includes an interface structured to receive a user input (e.g., the case management interface application 216) and to provide an interface for displaying information relating to fraud cases. In this regard, the agent can provide a user input to the agent computing terminal for retrieving the fraud case.

At step 504, the agent computing terminal transmits the case request to a fraud services application (e.g., the fraud services application circuit 314). The case request can include an indication of the assigned category databases. At step 506, the fraud services application retrieves the highest priority case from a central case repository (e.g., the central case repository 336). In this regard, the central case repository can include information relating to each fraud case, such as a category database corresponding to the fraud case and a priority score. In some embodiments, the fraud services application also retrieves information (e.g., transaction information) relating to the highest priority case from the central case repository.

At step 508, the fraud services application retrieves case details from the case management system. In some embodiments, the retrieved case details include an indication of a status of a case. For example, retrieved case details may indicate that a case has already been assigned to another fraud agent. In this regard, step 508 may relate to confirming whether a case has already been worked on and/or finished (e.g., by another fraud agent). In some embodiments, step 508 additionally or alternatively involves retrieving information relating to a highest priority case, for example when retrieving such information from the central case repository (step 506) is undesirable or not feasible. At step 510, the fraud services application provides an indication of the highest priority case and related information to the agent computing terminal. At step 512, an interface of the agent computing terminal (e.g., the case management interface application 216) presents the highest priority case and related information to the agent.

Figure 6:
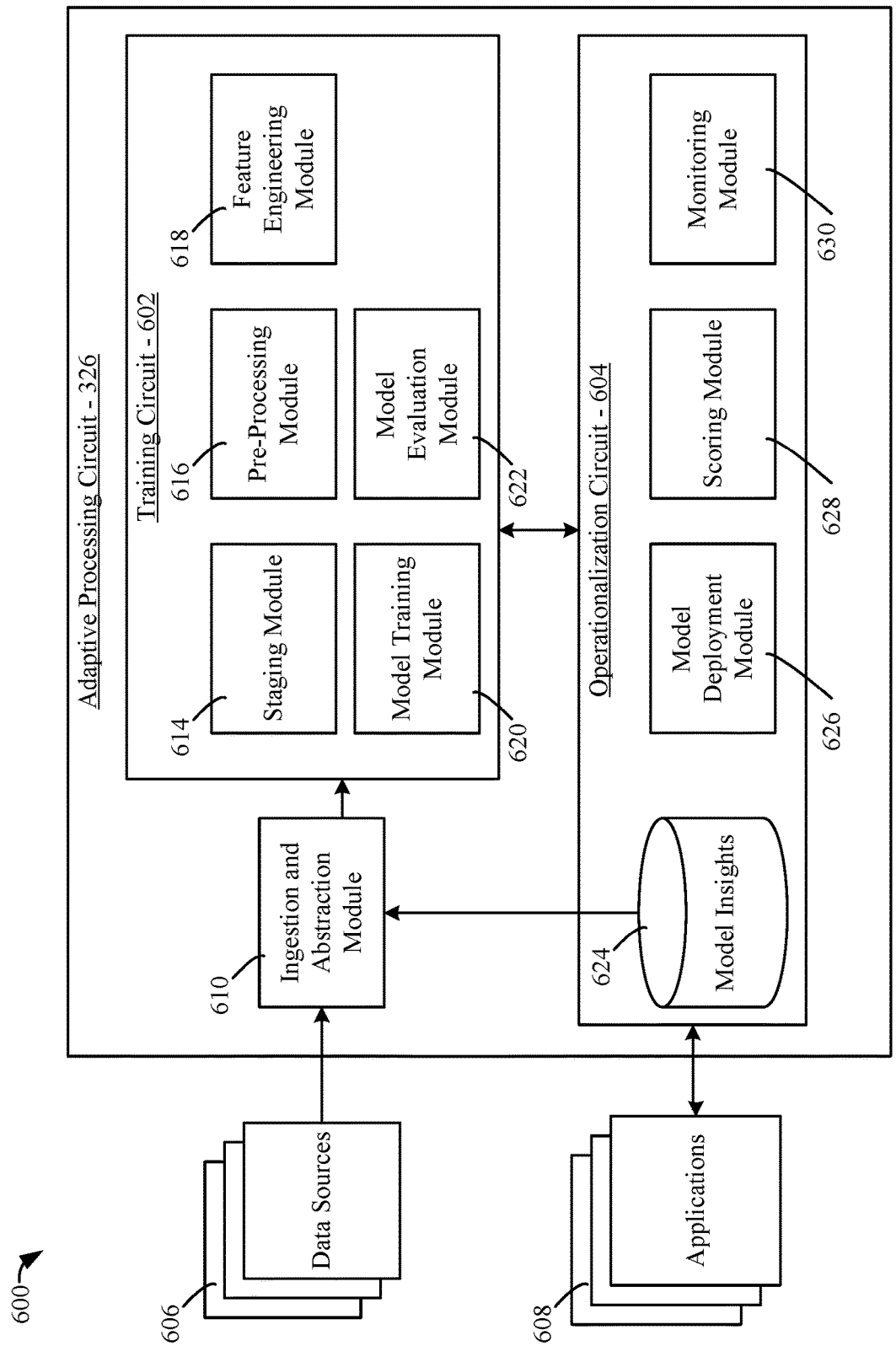
FIG. 6 is a diagram of the artificial intelligence circuit of FIG. 3, according to an example embodiment.

Referring to FIG. 6, the adaptive processing circuit 326 is shown in greater detail, according to an example embodiment. In this example embodiment, the adaptive processing circuit 326 is generally structured to train and operate a machine learning model for developing a set of prioritization rules and/or automatic-action rules. The machine learning model can include various algorithms to create and update predictive models, recognize previously unknown patterns of fraudulent activity, and/or develop deep insights relating to fraudulent activity. The rules can be developed using any supervised machine learning model and/or an unsupervised machine learning model. Any machine learning model can be used, such as Bayesian networks, link analysis, classification, linear regression, logistic regression, dimension reduction, clustering, principal component analysis, anomaly-detection, etc. In some embodiments, a classification model can be initially used to associate each fraud case with either one of two groups. The first group can correspond to fraud cases relating to a sufficient risk of fraudulent activity, and the second group can correspond to fraud cases relating to an acceptable risk of fraudulent activity such that fraud cases of the second group can be automatically closed.

The adaptive processing circuit 326 is shown to include an ingestion and abstraction module 610, which can be generally structured to receive data from the data sources 606. The ingestion and abstraction module 610 can be structured to receive or ingest data using any suitable platform or method (e.g., Kafka). In some embodiments, received data includes sets of fraud cases, such as described herein. The data sources 606 can include any source, such as the fraud systems 108 and/or a component of the system 100. In some embodiments, the data sources 606 include the disposition database 312, for example to facilitate retraining of the model. In some embodiments, received data includes transaction data. In this regard, the ingestion and abstraction module 610 is structured to generate fraud cases based on received transaction data.

In some embodiments, the ingestion and abstraction module 610 is structured to receive data in batches. For example, the received data can include a batch of credit card fraud cases over a twelve-month period. In some embodiments, the ingestion and abstraction module 610 is structured to receive streaming data. For example, transaction data or fraud cases can be provided in real-time or near real-time as the transactions occur. The ingestion and abstraction module 610 can be structured to use any suitable or convention system of data abstraction. In some embodiments, received data is registered in a data registry database.

The adaptive processing circuit 326 is shown to further include a training circuit 602 and an operationalization circuit 604. The training circuit 602 is generally structured to perform a training process shown to include a staging module 614, a pre-processing module 616, a feature engineering module 618, a model training module 620, and a model evaluation module 622. In some embodiments, one or more of the staging module 614, the pre-processing module 616, the feature engineering module 618, the model training module 620, and the model evaluation module 622 can be provided separately from the training circuit 602.

The staging module 614 can be structured to hold relevant data for training. In some embodiments, the staging module 614 is structured to hold a set of training data, a set of test data, and/or a set of validation data. The pre-processing module 616 can be structured to transform the data, normalize the data, clean the data, and/or encode the data in a suitable format for processing by the model training circuit 602. In some embodiments, the pre-processing module 616 is structured to perform an error correction process. The feature engineering module 618 can be structured to perform one or more processes relating to data classification, feature generation, visualization, and sample selection for training and testing. The model training module 620 can be structured to receive the training data for training the model. In some embodiments, the model training module 620 is structured to select one or more preferred machine learning algorithms. The model evaluation module 622 can be structured to experiment, test, tune, and evaluate the model. In this regard, the model evaluation module 622 can be structured to receive the set of test data and/or the set of validation data.

The operationalization circuit 604 can be structured to communicate data with the applications 608. The applications 608 can include one or more components of the fraud management system 124, such as the rule implementation circuit 322 and/or the fraud services application circuit 314. In some embodiments, the applications 608 are structured to invoke the scoring module 628, for example to develop a set of rules based on an updated model. The operationalization circuit 604 is shown to include a model deployment module 626, a scoring module 628, a monitoring module 630, and a model insights database 624. In some embodiments, one or more of the model deployment module 626, the scoring module 628, the monitoring module 630, and the model insights database 624 can be provided separately from the training circuit 602.

The model deployment module 626 can be structured to receive information relating to a trained model from the training circuit 602. The scoring module 628 can be structured to facilitate batch scoring of the model, exposing the model as a service, real-time scoring, and/or deploy the model in an application. The monitoring module 630 can be structured to receive information from the scoring module 628 and provide received information to the training circuit 602 for retraining the model. The model insights database 624 can be structure to receive and store information from the scoring module 628 relating to insights or patterns of the model. Stored information can be transmitted to the ingestion and abstraction module 610.

Figure 7:
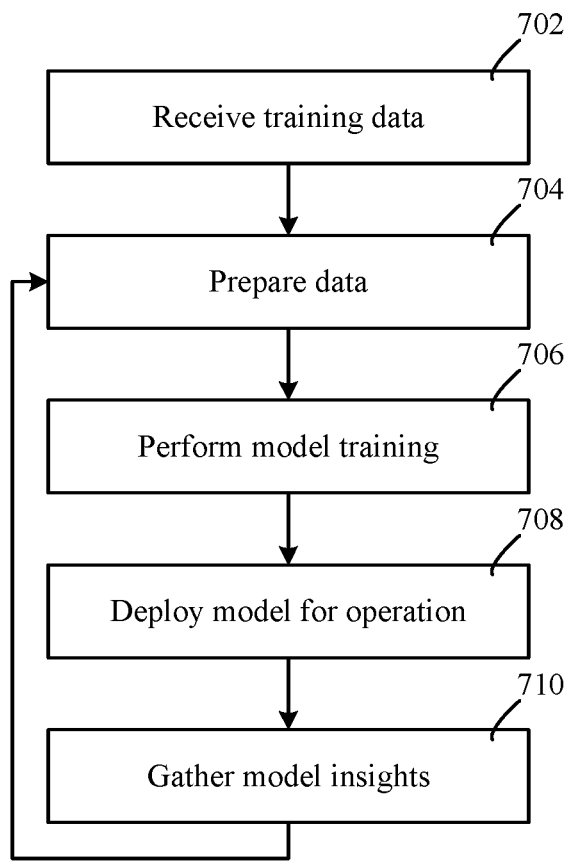
FIG. 7 is a flow diagram of a method of generating a machine learning model, according to an example embodiment.

Referring now to FIG. 7, a flow diagram of a method 700 for generating a machine learning model is shown, according to an example embodiment. Method 700 can relate to generating any supervised machine learning model and/or unsupervised machine learning model, such as Bayesian networks, link analysis, classification, linear regression, logistic regression, dimension reduction, clustering, principal component analysis, anomaly-detection, etc.

At step 702, training data is received. Training can be received in batch or streaming, using any suitable platform (e.g., Kafka). The training data can be received from any number of data sources, such as the fraud systems 108, a component of the provider computing system 102 (e.g., the disposition database 312), the merchant computing system 104. In some embodiments, received data relates to sets of fraud cases. In some embodiments, received data relates to transaction data or fraud cases provided in real-time or near real-time as the transactions occur.

At step 704, received data is prepared for model training. Preparing the data can relate to transforming the data, normalizing the data, cleaning the data, and/or encoding the data in a suitable format for processing by the model training circuit 602. In some embodiments, step 704 includes performing a data abstraction process.

At step 706, model training is performed. Model training can include training a model using a first dataset, testing the model using a second dataset, and/or validating the model using a third dataset. Embodiments can use any suitable model training process and can be based on the type of model used.

At step 708, the model is deployed for operation. Model deployment can relate to batch scoring of the model, exposing the model as a service, real-time scoring, and/or deploy the model in an application. In some embodiments, model deployment includes receiving a case disposition associated with each fraud case.

At step 710, the case disposition can be used to gather model insights. In some embodiments, the model insights include case disposition information for retraining the model as described herein. In this regard, the method 700 may return to step 704.

Although embodiments of the concepts disclosed herein include examples relating to transactions, it should be understood that the present disclosure is not limited to transactions. For example, the concepts disclosed herein can apply to prioritizing fraud cases relating to identity theft or other forms of fraud. In some embodiments, the concepts disclosed herein can also apply to prioritizing any form of data in any industry or commercial setting, such as prioritizing calls or emails for a customer service center.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   training, by a fraud management processing circuit, a machine learning model utilizing training data, wherein the training data comprises test data and validation data associated with previous fraud cases and historical transaction data;
   receiving, by the fraud management processing circuit, sets of fraud cases based on a trigger event, each fraud case relating to one or more transactions and having transaction data and an initial priority score, wherein the transaction data comprises authentication information indicating a type of authentication used in the one or more transactions and location information indicating a location of the one or more transactions and a presence of a user device of an account holder during the one or more transactions, wherein the trigger event indicates the initial priority score exceeded a predetermined threshold;

generating, by the fraud management processing circuit, a plurality of category queues based on ranking each case of the sets of fraud cases, wherein each category queue is sorted based on the initial priority score of each case of the sets of fraud cases;

determining, by the fraud management processing circuit, an updated priority score for each fraud case based on the transaction data and case prioritization data, the case prioritization data comprising rules developed using the machine learning model, wherein one or more of the rules are based on the type of authentication used in the one or more transactions and a travel characteristic of the presence of the account holder at the location;

re-sorting, by the fraud management processing circuit, the plurality of category queues based on the updated priority score;

assembling, by the fraud management processing circuit, a first group of the fraud cases in a single database based on the re-sorted plurality of category queues, the first group of the fraud cases being associated with a first risk level of a first queue, wherein the first risk level is based on the updated priority score being above the predetermined threshold;

performing, by the fraud management processing circuit, an action on a second group of the fraud cases based on the re-sorted plurality of category queues, the second group of the fraud cases being associated with a second risk level of a second queue, wherein the second risk level is based on the updated priority score being below the predetermined threshold, and wherein the action comprises automatically closing a fraud case of the second group;

assigning, by the fraud management processing circuit, at least one of the first group of the fraud cases to a fraud agent computing terminal associated with a fraud agent;

receiving, by the fraud management processing circuit, a fraud agent input from the fraud agent computing terminal regarding a disposition of an assigned fraud case;

retraining, by the fraud management processing circuit in real-time, the machine learning model based on providing the fraud agent input and the transaction data as input into the machine learning model; and restructuring, by the fraud management processing circuit, the case prioritization data based on the retrained machine learning model.

2. The method of claim 1, wherein the sets of fraud cases are received from a fraud identification system, and wherein the fraud identification system assigns the initial priority score.

3. The method of claim 1, wherein the updated priority score is higher than the initial priority score, lower than the initial priority score, or the same as the initial priority score.

4. The method of claim 1, wherein each of the sets of fraud cases corresponds to a case category, the case category comprising at least one of a credit card transaction category, a debit card transaction category, an online transaction category, or an identity theft category.

5. The method of claim 1, wherein assigning the first group of the fraud cases to the fraud agent computing terminal associated with the fraud agent comprises:

receiving, from the fraud agent computing terminal, a request to return a highest priority fraud case;

determining the highest priority fraud case by identifying a fraud case in the first group of the fraud cases having a highest updated priority score; and transmitting the highest priority fraud case to the fraud agent computing terminal.

6. The method of claim 1, further comprising:

receiving, by the fraud management processing circuit, the sets of fraud cases in response to receiving the trigger event, wherein the trigger event relates to a reoccurring time period or a potentially fraudulent transaction.

7. The method of claim 1, further comprising:

storing, by the fraud management processing circuit, the sets of fraud cases, the updated priority score, and the case prioritization data in a central case database.

8. The method of claim 1, wherein the machine learning model comprises at least one of a supervised learning model, an unsupervised learning model, or a reinforcement learning model.

9. The method of claim 1, wherein the machine learning model comprises a classification model configured to associate each fraud case with the first group of the fraud cases or the second group of the fraud cases.

10. An apparatus comprising:

a fraud management processing circuit included in a provider computing system associated with a provider institution, the fraud management processing circuit structured to:

train a machine learning model utilizing training data, wherein the training data comprises test data and validation data associated with previous fraud cases and historical transaction data;

receive sets of fraud cases based on a trigger event, each fraud case relating to one or more transactions and having transaction data and an initial priority score, wherein the transaction data comprises authentication information indicating a type of authentication used in the one or more transactions and location information indicating a location of the one or more transactions and a presence of a user device of an account holder during the one or more transactions, wherein the trigger event indicates the initial priority score exceeded a predetermined threshold;

generate a plurality of category queues based on ranking each case of the sets of fraud cases, wherein each category queue is sorted based on the initial priority score of each case of the sets of fraud cases;

determine an updated priority score for each fraud case based on the transaction data and case prioritization data, the case prioritization data comprising rules developed using the machine learning model, wherein one or more of the rules are based on the type of authentication used in the one or more transactions and a travel characteristic of the presence of the account holder at the location;

re-sort the plurality of category queues based on the updated priority score;

assemble a first group of the fraud cases in a single database based on the re-sorted plurality of category queues, the first group of the fraud cases being associated with a first risk level of a first queue, wherein the first risk level is based on the updated priority score being above the predetermined threshold;

perform an action on a second group of the fraud cases based on the re-sorted plurality of category queues, the second group of the fraud cases being associated with a second risk level of a second queue, wherein the second risk level is based on the updated priority score being below the predetermined threshold, and wherein the action comprises automatically closing a fraud case of the second group;

assign at least one of the first group of the fraud cases to a fraud agent computing terminal associated with a fraud agent;

receive a fraud agent input from the fraud agent computing terminal regarding a disposition of an assigned fraud case;

retrain, in real-time, the machine learning model based on providing the fraud agent input and the transaction data as input into the machine learning model; and restructure the case prioritization data based on the retrained machine learning model.

11. The apparatus of claim 10, wherein the sets of fraud cases are received from a fraud identification system, and wherein the fraud identification system assigns the initial priority score.

12. The apparatus of claim 10, wherein the updated priority score is higher than the initial priority score, lower than the initial priority score, or the same as the initial priority score.

13. The apparatus of claim 10, wherein each of the sets of fraud cases corresponds to a case category, the case category comprising at least one of a credit card transaction category, a debit card transaction category, an online transaction category, or an identity theft category.

14. The apparatus of claim 10, wherein assigning the first group of the fraud cases to the fraud agent computing terminal associated with the fraud agent comprises:
receiving, from the fraud agent computing terminal, a request to return a highest priority fraud case;
determining the highest priority fraud case by identifying a fraud case in the first group of the fraud cases having a highest updated priority score; and
transmitting the highest priority fraud case to the fraud agent computing terminal.

15. The apparatus of claim 10, wherein the fraud management processing circuit is further structured to:
receive the sets of fraud cases in response to receiving the trigger event, wherein the trigger event relates to a reoccurring time period or a potentially fraudulent transaction.

16. The apparatus of claim 10, wherein the fraud management processing circuit is further structured to store the sets of fraud cases, the updated priority score, and the case prioritization data in a central case database.

17. The apparatus of claim 10, wherein the machine learning model comprises at least one of a supervised learning model, an unsupervised learning model, or a reinforcement learning model.

18. The apparatus of claim 10, wherein the machine learning model comprises a classification model configured to associate each fraud case with the first group of the fraud cases or the second group of the fraud cases.

19. A method comprising:
training, by a fraud management processing circuit, a machine learning model utilizing training data, wherein the training data comprises test data and validation data associated with previous fraud cases and historical transaction data;

receiving, by the fraud management processing circuit, sets of fraud cases based on a trigger event, each fraud case relating to one or more transactions and having transaction data and an initial priority score, wherein the transaction data comprises authentication information indicating a type of authentication used in the one or more transactions and location information indicating a location of the one or more transactions and a presence of a user device of an account holder during the one or more transactions, wherein the trigger event indicates the initial priority score exceeded a predetermined threshold;

generating, by the fraud management processing circuit, a plurality of category queues based on ranking each case of the sets of fraud cases, wherein each category queue is sorted based on the initial priority score of each case of the sets of fraud cases;

determining, by the fraud management processing circuit, an updated priority score for each fraud case based on the transaction data and case prioritization data, the case prioritization data comprising rules developed using the machine learning model, wherein one or more of the rules are based on the type of authentication used in the one or more transactions and a travel characteristic of the presence of the account holder at the location;

re-sorting, by the fraud management processing circuit, the plurality of category queues based on the updated priority score;

assembling, by the fraud management processing circuit, a first group of the fraud cases in a single database based on the re-sorted plurality of category queues, the first group of the fraud cases being associated with a first risk level of a first queue, wherein the first risk level is based on the updated priority score being above the predetermined threshold;

performing, by the fraud management processing circuit, an action on a second group of the fraud cases based on the re-sorted plurality of category queues, the second group of the fraud cases being associated with a second risk level of a second queue, wherein the second risk level is based on the updated priority score being below the predetermined threshold, and wherein the action comprises automatically closing a fraud case of the second group;

assigning, by the fraud management processing circuit, at least one of the first group of the fraud cases to a fraud agent computing terminal associated with a fraud agent;

receiving, by the fraud management processing circuit, a fraud agent input from the fraud agent computing terminal regarding a disposition of an assigned fraud case;

retraining, by the fraud management processing circuit in real-time, the machine learning model based on providing the fraud agent input and the transaction data as input into the machine learning model; and restructuring, by the fraud management processing circuit, the case prioritization data based on the retrained machine learning model;

wherein each fraud case is associated with at least one case category of a plurality of case categories;

wherein the updated priority score for each fraud case is determined based on the at least one case category; and wherein closing a particular fraud case of the second group of the fraud cases is based on determining that the updated priority score for the particular fraud case is below a threshold.

20. The method of claim 19, wherein the sets of fraud cases are received from a fraud identification system, and wherein the fraud identification system assigns the initial priority score.

21. The method of claim 19, wherein the updated priority score is higher than the initial priority score, lower than the initial priority score, or the same as the initial priority score.

22. The method of claim 19, wherein the plurality of case categories comprises at least one of a credit card transaction category, a debit card transaction category, an online transaction category, or an identity theft category.

23. The method of claim 19, wherein assigning the first group of the fraud cases to the fraud agent computing terminal associated with the fraud agent comprises:
   receiving, from the fraud agent computing terminal, a request to return a highest priority fraud case;
   determining the highest priority fraud case by identifying a fraud case in the first group of the fraud cases having a highest updated priority score; and
   transmitting the highest priority fraud case to the fraud agent computing terminal.

24. The method of claim 19, further comprising:
   receiving, by the fraud management processing circuit, the sets of fraud cases in response to receiving the trigger event, wherein the trigger event relates to a reoccurring time period or a potentially fraudulent transaction.

25. The method of claim 19, further comprising:
   storing, by the fraud management processing circuit, the sets of fraud cases, the updated priority score, and the case prioritization data in a central case database.

26. The method of claim 19, wherein the machine learning model comprises at least one of a supervised learning model, an unsupervised learning model, or a reinforcement learning model.

27. The method of claim 19, wherein the machine learning model comprises a classification model configured to associate each fraud case with the first group of the fraud cases or the second group of the fraud cases.

\* \* \* \* \*